(12) United States Patent
Ereifej

(10) Patent No.: US 8,208,816 B2
(45) Date of Patent: Jun. 26, 2012

(54) METHOD AND APPARATUS FOR DISPERSION MITIGATION IN OPTICAL LINKS

(75) Inventor: Heider Ereifej, Quakertown, PA (US)

(73) Assignee: Finisar Corporation, Horsham, PA (US)

( * ) Notice: Subject to any disclaimer, the term of this patent is extended or adjusted under 35 U.S.C. 154(b) by 854 days.

(21) Appl. No.: 12/106,291

(22) Filed: Apr. 19, 2008

(65) Prior Publication Data

US 2008/0260394 A1     Oct. 23, 2008

Related U.S. Application Data

(60) Provisional application No. 60/925,505, filed on Apr. 20, 2007.

(51) Int. Cl.
H04B 10/00 (2006.01)

(52) U.S. Cl. ........ 398/159; 398/147; 398/158; 398/188; 398/183; 398/202; 398/208; 398/209; 398/212; 398/213; 398/214; 359/279; 359/325; 385/11; 385/14; 385/27

(58) Field of Classification Search ............... 398/183, 398/188, 202, 158, 159, 147, 141, 200, 201, 398/81, 79, 203, 204, 207, 208, 209, 210, 398/211, 214, 192, 193, 194, 212, 213, 149, 398/161; 359/237, 238, 279, 325; 385/24, 385/11, 14, 15, 27

See application file for complete search history.

(56) References Cited

U.S. PATENT DOCUMENTS

| | | | |
|---|---|---|---|
| 6,947,206 B2 | 9/2005 | Tsadka et al. | |
| 2002/0176134 A1* | 11/2002 | Vohra | 359/127 |
| 2003/0175036 A1 | 9/2003 | Mamyshev et al. | |
| 2003/0175037 A1 | 9/2003 | Kimmitt et al. | |
| 2003/0218790 A1 | 11/2003 | Mikkelsen et al. | |
| 2005/0088659 A1 | 4/2005 | Schlenk et al. | |
| 2006/0072924 A1 | 4/2006 | Lee et al. | |
| 2006/0133817 A1* | 6/2006 | Xie | 398/161 |

(Continued)

FOREIGN PATENT DOCUMENTS

EP   0 967 743 A2   12/1999

(Continued)

OTHER PUBLICATIONS

"Notification of Transmittal of the International Search Report and the Written Opinion of the International Searching Authority, or the Declaration" for PCT/US2008/005093, Jul. 10, 2008, 10 pages, The International Searching Authority/EPO, Rijswijk, The Netherlands.

(Continued)

*Primary Examiner* — Hanh Phan
(74) *Attorney, Agent, or Firm* — Kurt Rauschenbach; Rauschenbach Patent Law Group, LLP

(57) ABSTRACT

An optical communications system includes an optical transmitter that generates a modulated optical signal at an output. The modulated optical signal propagates through an optical link where the dispersion of the optical link is imprinted onto an optical spectrum of the modulated optical signal. A demodulator receives the modulated optical signal and filters at least a portion of the optical spectrum with the imprinted dispersion of the optical link, thereby mitigating effects of dispersion in the modulated optical signal and generating a demodulated optical signal at an output. An optical detector generates an electrical data signal from the demodulated optical signal.

25 Claims, 21 Drawing Sheets

U.S. PATENT DOCUMENTS

| | | | |
|---|---|---|---|
| 2006/0171720 A1* | 8/2006 | Agarwal et al. | 398/186 |
| 2007/0196110 A1 | 8/2007 | Mikkelsen et al. | |
| 2008/0231941 A1* | 9/2008 | Malouin et al. | 359/325 |
| 2008/0232821 A1* | 9/2008 | Malouin et al. | 398/202 |

FOREIGN PATENT DOCUMENTS

| | | |
|---|---|---|
| EP | 1 519 499 A1 | 3/2005 |
| GB | 2 257 319 A | 1/1993 |
| WO | 2007/025037 A2 | 3/2007 |

OTHER PUBLICATIONS

"Notification Concerning Transmittal of International Preliminary Report on Patentability (Chapter I of the Patent Cooperation Treaty" for PCT/US2008/005093, the International Bureau of WIPO, Oct. 29, 2009, 7 pgs., Geneva Switzerland.

Lyubomirsky, I., Advanced Modulation Formats for Ultra-Dense Wavelength Division Multiplexing, pp. 1-14, University of California, Riverside, California, USA. (No Date), Feb. 7, 2005.

Agarwal, et al., Experimental Study of Photocurrent Imbalance in a 42.7-Gb/s DPSK Receiver Under Strong Optical Filtering, 2005, pp. 1-3, Optical Society of America.

Bosco, et al., The Impact of Receiver Imperfections on the Performance of Optical Direct-Detection DPSK, Journal of Lightwave Technlogy, Feb. 2005, pp. 842-848, vol. 23, No. 2.

Yoshikane et al., Benefit of Half-Bit Delay Demodulation for Severely Bandlimited RZ-DPSK Signal, KDDI R & D Laboratories, Japan., 2008.

Gnauck, A.H., et al., 2.5 Tb/s (64X42.7 Gb/s) Transmission Over 40X100 km NZKSF Using RZ-DPSK Format and All-Raman-Amplified Spans, 2002, pp. FC2-1-FC2-3, Optical Society of America.

Humblet, et al., On the Bit Error Rate of Lightwave Systems With Optical Amplifiers, Journal of Lightwave Technology, Nov. 1991, pp. 1576-1582, vol. 9, No. 11.

Hsieh, et al., Athermal Demodulator for 42.7-Gb/s DPSK Signals.

Lyubomirsky, et al., DPSK Demodulator Based on Optical Discriminator Filter, IEEE Photonics Technology Letters, Feb. 2005, pp. 492-494, vol. 17, No. 2., 2005.

Gnauck, et al., "Optical phase-shift-keyed transmission," IEEE Journal of Lightwave Technology, vol. 23, pp. 115-130, 2005.

Malouin et al., "DPSK Receiver Design-Optical Filtering Considerations," OFC 2007 OTHK1.

Lyubomirsky, et al, "Impact of Optical Filtering on Duobinary Transmission", IEEE Photon. Technol. Lett. 16, 1969 (2004).

Mikkelsen, et al., "Partial DPSK with excellent filter tolerance and OSNR sensitivity," Electronics Letters, vol. 42, pp. 1363-1365, 2006.

Malouin, "Differential Phase-Shift Keying Receiver Design Applied to Strong Optical Filtering" IEEE Journal of Lightwave Technology, vol. 25, pp. 3536-3542, 2007.

Winzer, et al., "Degradations in Balanced DPSK Receivers," IEEE Photonics Technology Letters, vol. 15, No. 9, Sep. 2003.

* cited by examiner

US 8,208,816 B2

METHOD AND APPARATUS FOR DISPERSION MITIGATION IN OPTICAL LINKS

RELATED APPLICATION SECTION

This application claims priority to U.S. Provisional Patent Application Ser. No. 60/925,505, filed Apr. 20, 2007, and entitled "Method and Apparatus for Dispersion Mitigation in Optical Link." The entire application of U.S. Provisional Patent Application Ser. No. 60/925,505 is incorporated herein by reference.

The section headings used herein are for organizational purposes only and should not to be construed as limiting the subject matter described in the present application.

BACKGROUND OF THE INVENTION

The increasing need for high bit-rate data transmissions through optical fibers presents significant challenges to the fiber-optic telecommunications industry. For example, high bit-rate systems are highly susceptible to optical fiber nonlinearities. One option to confront these challenges is to transmit the data in the Differential-Phase Shift Keying (DPSK) modulation format. The DPSK modulation format is a well known digital modulation format that conveys data by modulating the phase of the carrier wave. The DPSK modulation format is compatible with both RZ and NRZ data formats at high data rates.

The DPSK modulation format has numerous advantages over the more standard On-Of-Keying (OOK) modulation format. One advantage of using the DPSK modulation format is that, when DPSK signals are detected using a balanced receiver, the OSNR sensitivity is improved by up to 3 dB. See, for example, A. H. Gnauck and P. J. Winzer, "Optical Phase-Shift-Keyed Transmission," IEEE Journal of Lightwave Technology, vol. 23, pp. 115-30, 2005. Another advantage of using the DPSK modulation format over the OOK modulation format is that the DPSK modulation format is more tolerant to fiber optic non-linearities, such as self-phase modulation.

However, the DPSK modulation format is more complicated than the OOK modulation format. In DPSK systems, the digital information is written in the optical phase of the signal and, therefore, the digital information cannot be detected by ordinary intensity detectors. Consequently, DPSK receivers typically include optical demodulators, which convert the phase modulated signal to an amplitude modulated signal. The resulting amplitude modulated signal can then be detected by ordinary optical power detectors.

For most optical networks, chromatic dispersion is a major limitation to the distance of the fiber optical links and determines the complexity of network. Chromatic dispersion is a well known effect in all fiber optic systems that causes intersymbol interference. In most cases, dispersion effects are a direct function of the transmitted signal bandwidth. The higher the bandwidth, the higher the link penalty due to chromatic dispersion. DPSK modulation, in particular, has a larger bandwidth compared to most conventional data formats and, therefore, has a stringent tolerance to fiber chromatic dispersion.

BRIEF DESCRIPTION OF THE DRAWINGS

The aspects of this invention may be better understood by referring to the following description in conjunction with the accompanying drawings. Identical or similar elements in these figures may be designated by the same reference numerals. Detailed descriptions about these similar elements may not be repeated. The drawings are not necessarily to scale. The skilled artisan will understand that the drawings, described below, are for illustration purposes only. The drawings are not intended to limit the scope of the present teachings in any way.

DETAILED DESCRIPTION

Figure 1:
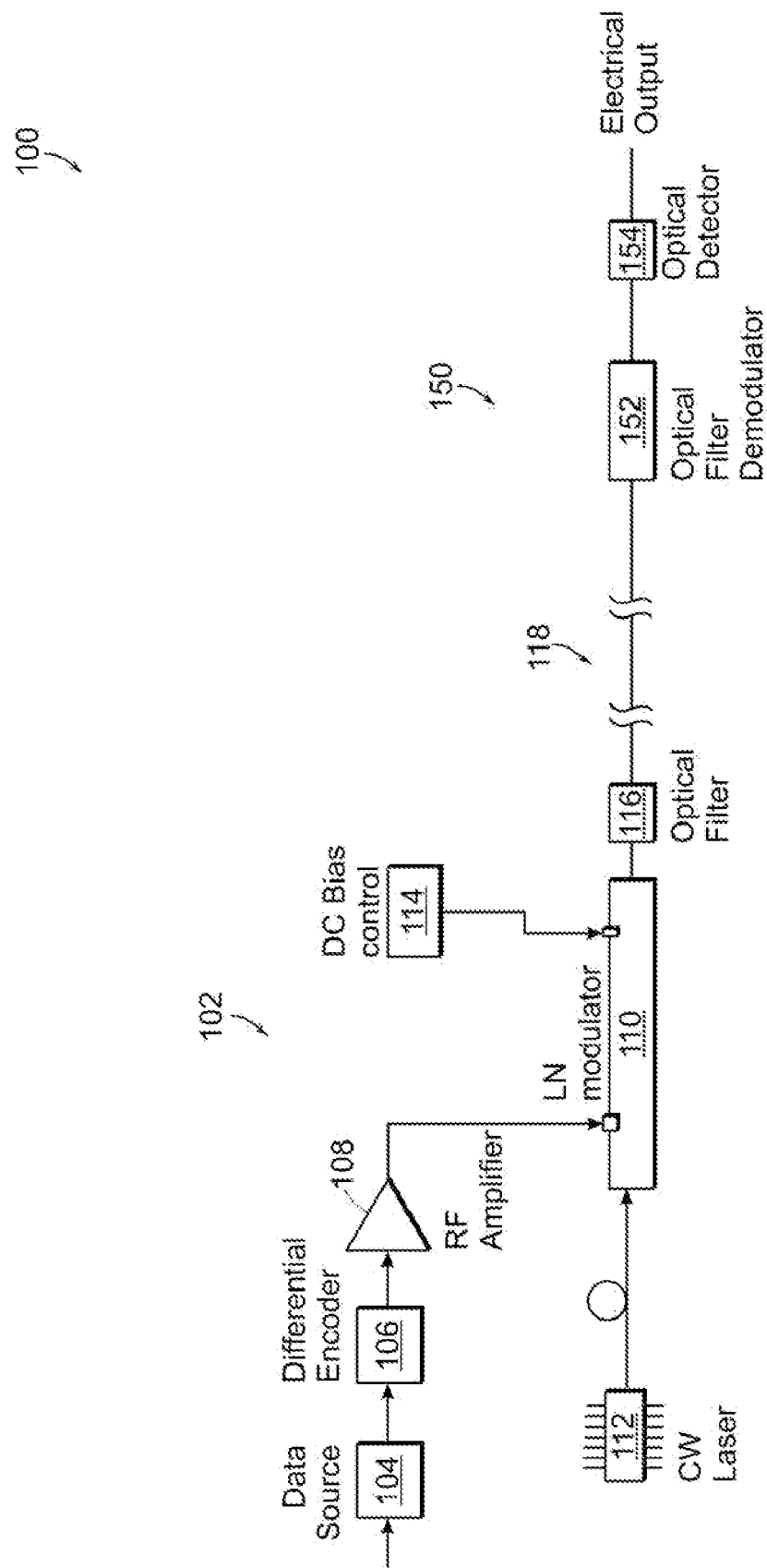
FIG. 1 illustrates a block diagram of a first embodiment of an optical communications system which mitigates the effects of dispersion by reducing or eliminating the portion of the optical spectrum that includes the dispersion imprint of the optical link by narrow optical filtering according to the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

It should be understood that the individual steps of the methods of the present invention may be performed in any order and/or simultaneously as long as the invention remains operable. Furthermore, it should be understood that the apparatus and methods of the present invention can include any number or all of the described embodiments as long as the invention remains operable.

The present teachings will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teachings herein will recognize additional implementations, modifications, and embodiments, as well as other fields of use, which are within the scope of the present disclosure as described herein. For example, although aspects of the present invention are described in connection with DPSK modulation, one skilled in the art will appreciate that the methods and apparatus of the present invention can be used with any type of modulated optical signal having second-order and higher-order dispersion characteristics, such as DPSK, RZ, NRZ, and DuoBinary modulated optical signals.

There is currently strong interest in DPSK optical communication systems because these systems can transmit and receive data at data rates that are higher than 40 Gbps and these high date rates can be achieved in existing optical network infrastructures that have been optimized for lower data rates. In particular, there is currently a desire to transmit 43 Gbps data rate signals in spectrally narrow channels through commercial 10 Gbps rate data channels. Conventional OOK data modulation formats can not be used to transmit 43 Gbps data rate signals through commercial 10 Gbps rate data channels because the quality of these high data rate signals will be severely deteriorated in the narrow spectrum filter used in add/drop filters, multiplexers, and demultiplexers along the optical link.

One disadvantage of DPSK optical communications systems is that they are particularly sensitivity to the chromatic dispersion in the underlying optical link. Chromatic dispersion occurs because the phase velocity of optical signal propagating in an optical fiber is frequency dependent. The different wavelengths of the optical signal, therefore, travel at different speeds along the optical link. Chromatic dispersion causes optical pulses to spread while they propagate in an optical fiber. The spreading or dispersion in the optical pulses degrades the optical signal and, therefore, reduces the optical signal-to-noise ratio over long distances.

Various embodiments of the methods and apparatus of the present invention use optical filtering and/or optical demodulation to shape the optical bandwidth of modulated optical signal to reduce or eliminate the portion of the optical spectrum of the modulated optical signal that includes the dispersion imprint of the optical link. Using such optical filtering and optical demodulation can significantly reduce dispersion effects in the received modulated optical signal. In particular, optical filtering according to the present invention can be used in the transmitter, receiver, and/or the optical link to shape the optical bandwidth of the modulated optical signal to reduce or eliminate the portion of the optical spectrum of the modulated optical signal that includes the dispersion imprint of the optical link.

FIG. 1 illustrates a block diagram of a first embodiment of an optical communications system 100 which mitigates the effects of dispersion by reducing or eliminating the portion of the optical spectrum that includes the dispersion imprint of the optical link by narrow optical filtering according to the present invention. The communications system 100 includes a transmitter 102 that includes a data source 104 that generates data at an output. The data source 104 can be a pulse pattern generator which generates predetermined data patterns. However, in a commercial communications system, the data source 104 is payload data and voice signals for transmission through the communications system 100.

An input of a differential pre-coder 106 is electrically connected to the output of the data source 104. The differential pre-coder 106 encodes the data and generates a pre-coded data modulation signal at an output. For example, the pre-coder 106 can include an XOR pre-coder with a 1-bit delay. Such an optical transmission system does not require a decoder on the receiver side to recover the original data that was transmitted.

An input of an RF amplifier 108 is electrically connected to the output of the differential pre-coder 106. The RF amplifier 108 generates an amplified pre-coded data modulation signal at an output. The RF amplifier 108 amplifies the pre-coded data modulation signal to signal levels that are desirable for modulation with electro-optic modulators. For example, the RF amplifier 108 can amplify the pre-coded data modulation signal to an amplitude that is equal to twice the Vpi of an electro-optic modulator. The Vpi of an electro-optic modulator is the switching voltage or the voltage that is required to switch the electro-optic modulator from a minimum intensity to a maximum intensity.

A modulation input of an electro-optic modulator 110 is electrically connected to the output of the RF amplifier 108. In many embodiments, the electro-optic modulator 110 is a Mach-Zehnder type interferometric (MZI) modulator, such as a Lithium Niobate (LiNbO3) MZI modulator. Such modulators are well known in the industry and have well defined characteristics.

An optical input of the electro-optic modulator 110 is electrically connected to an output of an optical source 112. The optical source 112 can be a continuous wave (CW) laser that generates a CW optical beam. A bias voltage power supply 114 is electrically connected to a bias input of the electro-optic modulator 110. The bias voltage power supply 114 biases the electro-optic modulator 110 at the desired operating point of the electro-optic modulator 110. The electro-optic modulator 110 then generates a modulated optical signal that is modulated by the data modulation signal at an output.

In some embodiments of the present invention the transmitter 100 also includes a narrow band optical filter 116. The narrow band optical filter 116 can be optically coupled to the output of the electro-optic modulator 110. The characteristics of the narrow band optical filter 116 are chosen to reduce the spectral broadening caused by second-order and higher-order non-linearities in the modulated optical signal.

An optical fiber link 118 is coupled to the output of the optical filter 116 or to the output of the electro-optic modulator 110 if a narrow band optical filter is not used in the transmitter 100. The optical fiber link 118 can be any type of optical fiber transmission link, such as a terrestrial or undersea optical fiber link. The optical fiber link 118 can also be a fiber spool, which is commonly used for testing.

The optical communications system 100 also includes a receiver 150 that is used to demodulate the received phase-encoded optical data and to detect the demodulated data. The receiver 150 includes a narrow-band optical filter demodulator 152 that demodulates the encoded optical signal to recover the data. It is well-known that a single optical filter can demodulate phase-encoded data. See, for example, F. Jacobsson, "DPSK Modulation Format for Optical Communication Using FBG Demodulator", Msc. Thesis, Depart. Science and Technology Linköpings University. Also, see I. Lyubomirsky and B. Pitchumani, "Impact of Optical Filtering on Duobinary Transmission", IEEE Photon. Technol. Lett. 16, 1969 (2004). Using a single optical filter is a relatively simple and inexpensive way to demodulate signals.

The narrow band optical filter demodulator 152 converts the phase information encoded on the modulated optical signal into amplitude changes. The characteristics of the narrow band filter demodulator 152 are chosen to shape the optical bandwidth of the received optical signal to reduce or eliminate the portion of the optical spectrum of the received optical signal that includes the dispersion imprint of the optical link 118. The receiver 150 also includes an optical detector 154 that is optically coupled to the output of the narrow band optical filter demodulator 152. The optical detector 154 converts the demodulated optical signal to an electrical demodulation signal.

In operation, the differential pre-coder 106 pre-codes the data from the original data source 104. The RF amplifier 108 amplifies the pre-coded data signal to an amplitude that is equal to the twice the Vpi of the electro-optic modulator 110 (or some other suitable amplitude). The bias voltage power supply 114 biases the electro-optic modulator 110 at the desired operating point. The CW laser 112 transmits an optical signal through the electro-optic modulator 110. The CW optical signal is then modulated by the electro-optic modulator 110 so that the modulated optical signal is phase pre-coded such that for every minimum-to-maximum transition in the RF modulation signal, a phase inversion occurs in the optical phase of the modulated optical signal.

In some embodiments, the modulated optical signal is then filtered by the narrow band optical filter 116 to reduce spectral broadening caused by second-order and higher-order non-linearities in the modulated optical signal that will cause pulse spreading due to dispersion during transmission. In these embodiments, the transmitted phase-encoded data from the electro-optic modulator 110 is the same as the original data, so there is no need for any electrical decoding at the receiver.

The modulated optical signal is then transmitted through the optical fiber link 118. The transmitted optical signal is received by the receiver 150 and is then demodulated by the narrow band optical filter demodulator 152. The narrow band optical filter demodulator 152 converts the phase information modulated on the optical signal into amplitude changes. In addition, the narrow band optical filter demodulator 152 reduces or eliminates the portion of the optical spectrum of the received optical signal that includes the dispersion imprint of the optical link 118. The optical detector 154 then converts the demodulated optical signal to an electrical demodulation signal.

Figure 2:
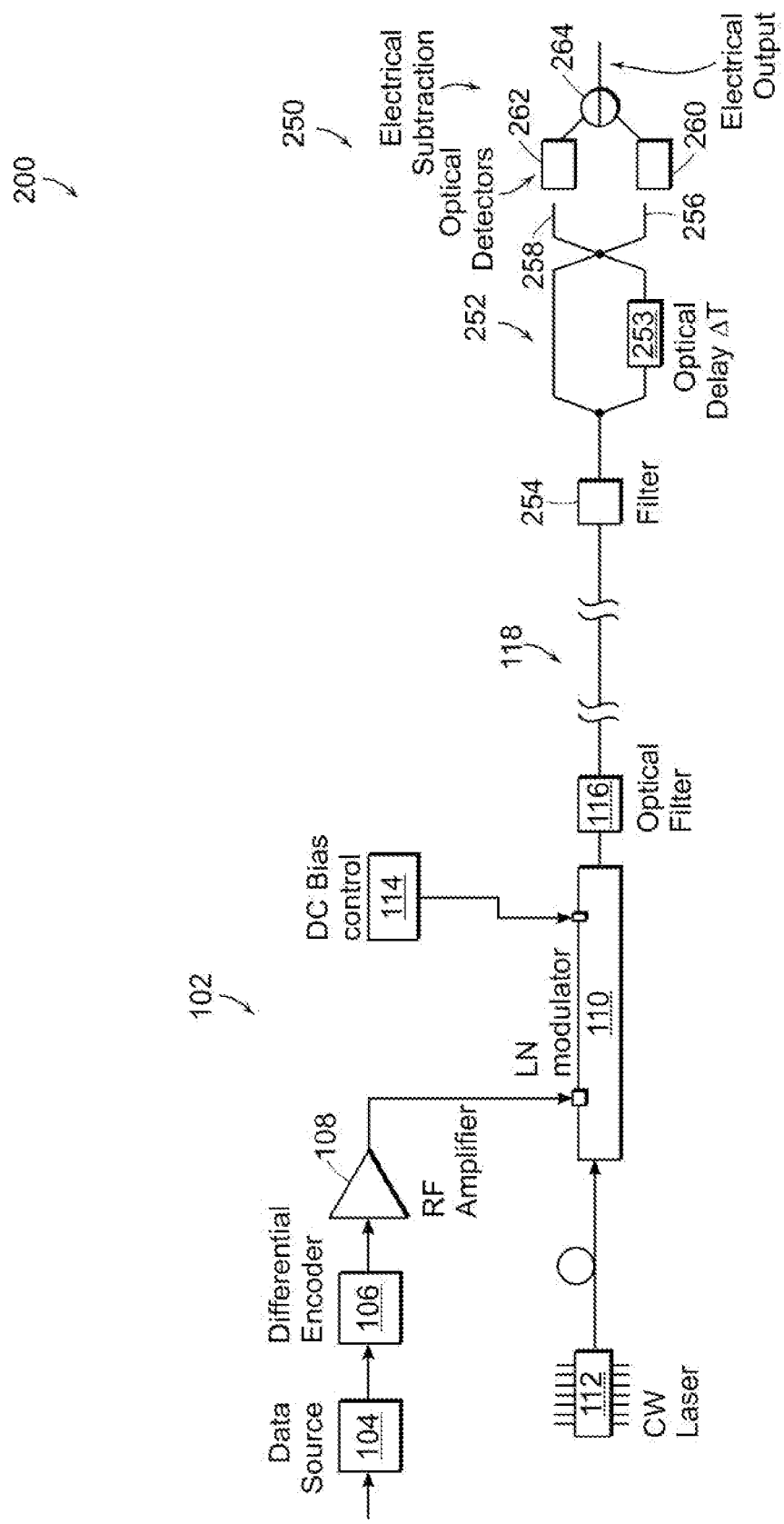
FIG. 2 illustrates a block diagram of a second embodiment of an optical communications system which mitigates the effects of dispersion by reducing or eliminating the portion of the optical spectrum that includes the dispersion imprint of the optical link by optimizing demodulation according to the present invention.

FIG. 2 illustrates a block diagram of a second embodiment of an optical communications system 200 which mitigates the effects of dispersion by reducing or eliminating the portion of the optical spectrum that includes the dispersion imprint of the optical link by optimizing demodulation according to the present invention. The optical communications system 200 is similar to the optical communications system 100 described in connection with FIG. 1. However, the receiver 250 includes an interferometric demodulator 252 that is optimized to reduce the effects of dispersion along the optical link 118.

In some embodiments, the receiver 250 includes a narrow band optical filter 254 having an input that is optically coupled to the output of the optical fiber link 118. The characteristics of the narrow band optical filter 254 are chosen to shape the optical bandwidth of the received modulated optical signal to reduce the portion of the optical spectrum of the received modulated optical signal that includes the dispersion imprint of the optical link 118.

The output of the narrow band optical filter 254 is optically coupled to the optical input of the interferometric demodulator 252. The interferometric demodulator 252 is a delay-interferometer (DI) type demodulator, which can be constructed from an asymmetric Mach-Zehnder- or Michelson-type interferometer having a differential delay. The differential delay is caused by an optical delay 253 in one arm of the interferometer that is different from the optical delay in the other arm of the interferometer. The delay-interferometric demodulator 252 regenerates the amplitude information from the encoded phase information, thereby recovering the transmitted original data and providing the data at a constructive 256 and a destructive output port 258 of the delay-interferometric demodulator 252.

The optical delay 253 in the delay-interferometric demodulator 252 is chosen or optimized to provide some optical filtering of the received optical modulation signal. The optical filtering is provided by a mismatch in the optical paths of the optical signals propagating in the two arms of the delay-interferometer demodulator 252 that is provided by the delay generator 253. In another embodiment, an interferometric modulator can be used that provides a mismatch in the amplitudes of the optical signals propagating in the two arms of the interferometer demodulator. This type of optical filtering can provide the same optimized filter shape as the optical filter demodulator 152 described in connection with FIG. 1.

The receiver 250 also includes a first 260 and second optical detector 262 that are optically coupled to respective ones of the constructive optical output port 256 and the destructive optical output port 258 of the delay-interferometer demodulator 252. The first and second optical detectors 260, 262 detect the demodulated data and generate an electrical data signal. A combiner 264 subtracts the signals from the constructive output port 256 and the destructive output port 258.

It has been widely accepted that the best performances can be achieved in delay-interferometric demodulators with differential delays equal to $\Delta T=nB^{-1}$, where n is an integer number and B is the symbol rate. However, it has been recently demonstrated, both experimentally and theoretically (with numerical simulations), that the undesirable effects of the spectrally narrow optical filters in the communication system can be partially compensated by using a delay interferometer with a differential delay that is smaller than the symbol time slot, $\Delta T<B^{-1}$.

In other words, spectrally narrow optical filters in the optical communication system can be partially compensated by using a delay interferometer with a Free Spectral Range (FSR) that is larger than the symbol rate, i.e., FSR>B. See, for example, B. Mikkelsen, C. Rasmussen, P. Mamyshev, and F. Liu, "Partial DPSK with Excellent Filter Tolerance and OSNR Sensitivity," Electronics Letters, vol. 42, pp. 1363-5, 2006. Also, see C. Malouin, J. Bennike, and T. Schmidt, "Differential Phase-Shift Keying Receiver Design Applied to Strong Optical Filtering" IEEE Journal of Lightwave Technology, vol. 25, pp. 3536-3542, 2007 and B. Mikkelsen, P. Mamyshev, C. Rasmussen, and F. Liu, "Partial DPSK (PDPSK) Transmission Systems" US2007/0196110 A1. In addition, see I. Lyubomirsky and C-C. Chien, "DPSK Demodulation Based on Optical Discriminator Filter", IEEE Photon. Technol. Lett. 17, 492 (2005).

Figure 3A:
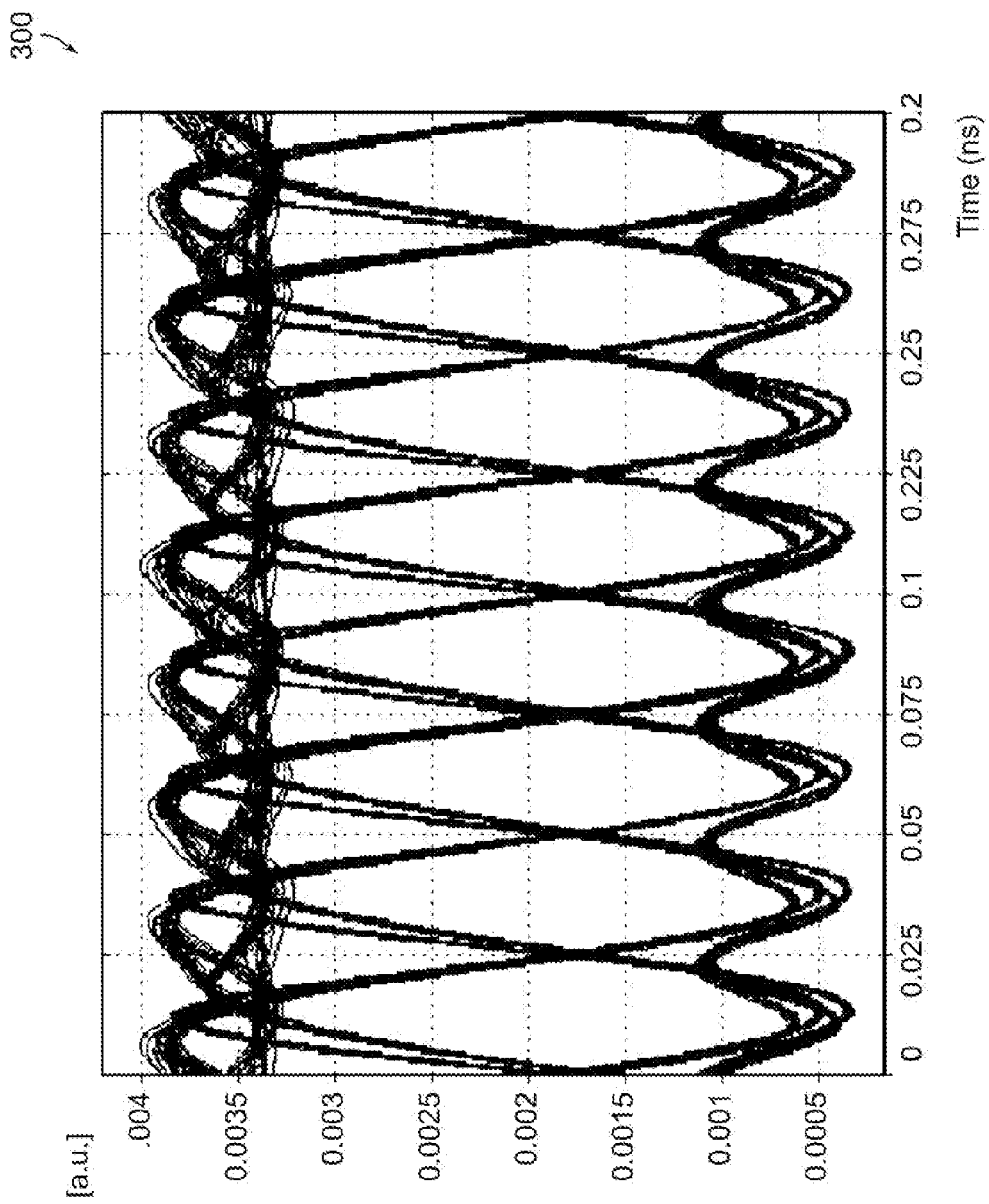
FIG. 3A presents a simulated eye diagram of a 40 Gbps DPSK signal after propagating through an 8 km optical link with a +140 psec/nm dispersion and being demodulated with a 32 GHz narrow band optical filter.
Figure 3B:
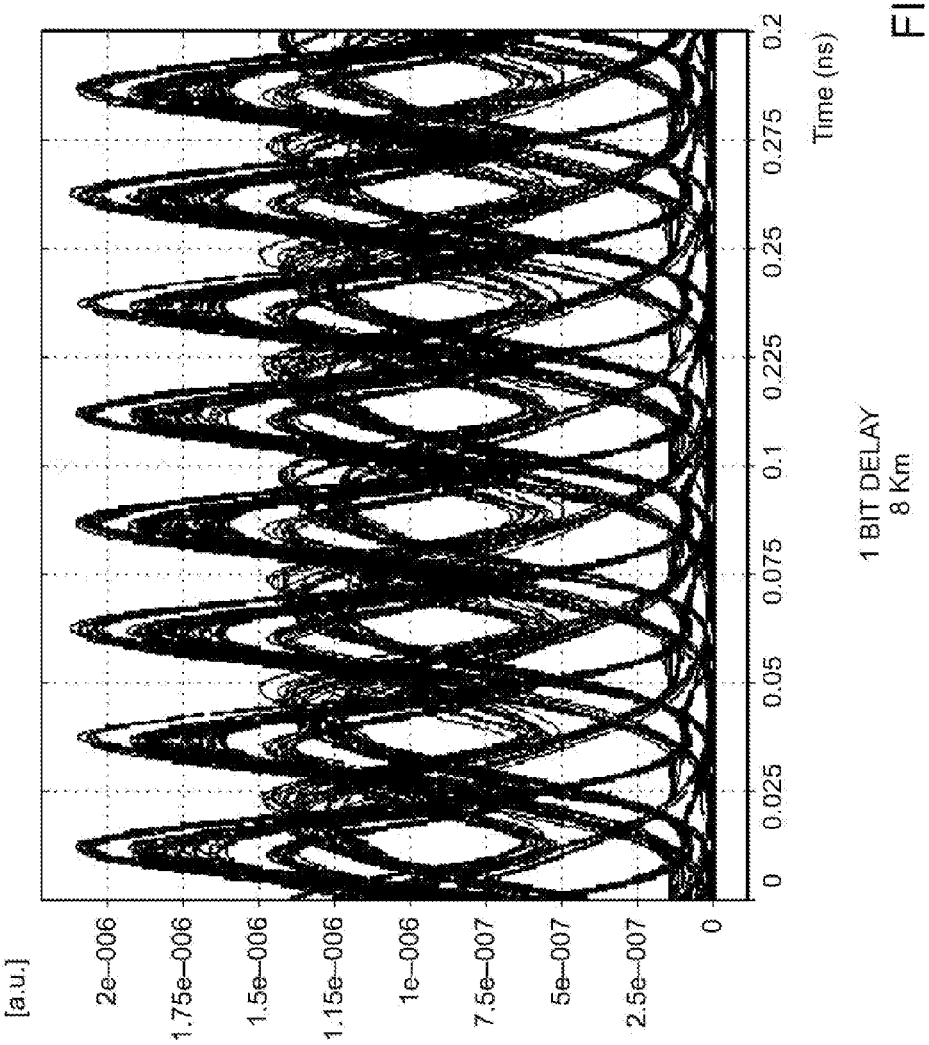
FIG. 3B presents a simulated eye diagram of a 40 Gbps DPSK signal after propagating through an 8 km optical link with a +140 psec/nm dispersion and being demodulated with a delay-interferometric demodulator having a standard 1-bit delay.
Figure 3C:
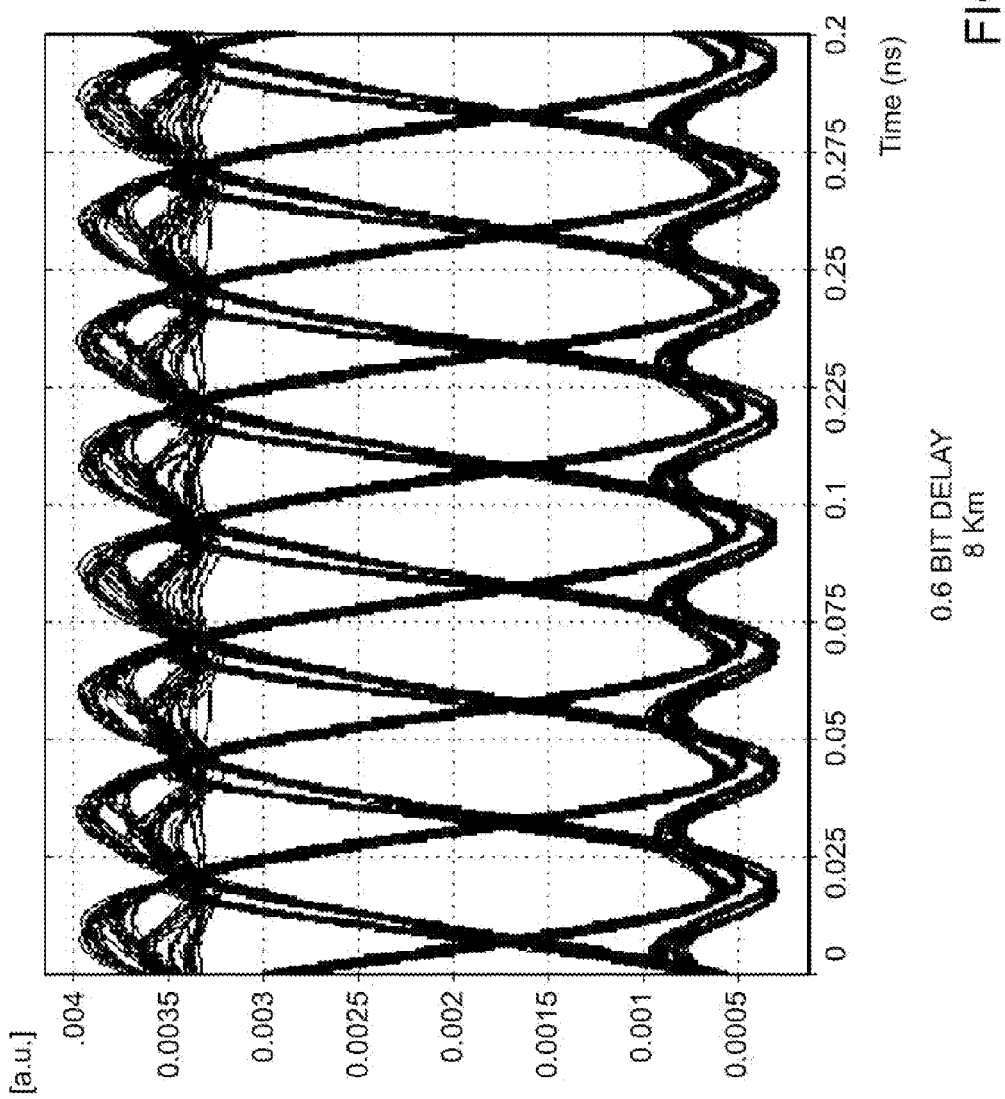
FIG. 3C presents a simulated eye diagram of a 40 Gbps DPSK signal after propagating through an 8 km optical link with a +140 psec/nm dispersion and being demodulated with a delay-interferometric demodulator having a standard 0.6-bit delay.

Using a delay-interferometer demodulator with a differential delay that is smaller than the symbol time slot, $\Delta T<B^{-1}$ can also optimize the demodulation to reduce the effects of dispersion in the received signal. Simulations have been performed to determine delays that best reduce the effects of dispersion in the received signal. FIGS. 3A-3C present simulated eye diagrams that compare the narrow band optical filter demodulator 152 described in connection with FIG. 1 with the delay-interferometer demodulator 252 described in connection with FIG. 2.

FIG. 3A presents a simulated eye diagram 300 of a 40 Gbps DPSK signal after propagating through an 8 km optical link with a +140 psec/nm dispersion and being demodulated with a 32 GHz narrow band optical filter. The simulated eye diagram 300 shows minimal inter-symbol interference due to dispersion and clearly distinguished eyes that are open enough to distinguish the received digital signal with most receivers.

FIG. 3B presents a simulated eye diagram 310 of a 40 Gbps DPSK signal after propagating through an 8 km optical link with a +140 psec/nm dispersion and being demodulated with a delay-interferometric demodulator having a standard 1-bit delay. The simulated eye diagram 310 shows substantial inter-symbol interference due to dispersion. However, the simulated eye diagram 310 has center eye patterns that are open enough to distinguish the transmitted data but with a significant penalty due to chromatic dispersion.

FIG. 3C presents a simulated eye diagram 320 of a 40 Gbps DPSK signal after propagating through an 8 km optical link with a +140 psec/nm dispersion and being demodulated with a delay-interferometric demodulator having a 0.6-bit delay. The 0.6-bit delay has been determined through extensive simulations to significantly reduce the effects of dispersion in the received signal. In one embodiment of the present invention, a delay-interferometric demodulator having a bit delay in the range of 0.55 to 0.75 is used. The simulated eye diagram 330 shows minimal inter-symbol interference due to dispersion and clearly distinguished eyes that are open enough to distinguish the received digital signal with most receivers. The simulated eye diagram 330 is similar to the simulated eye diagram 300 obtain by simulating the demodulation with a 32 GHz narrow band optical filter.

Figure 3D:
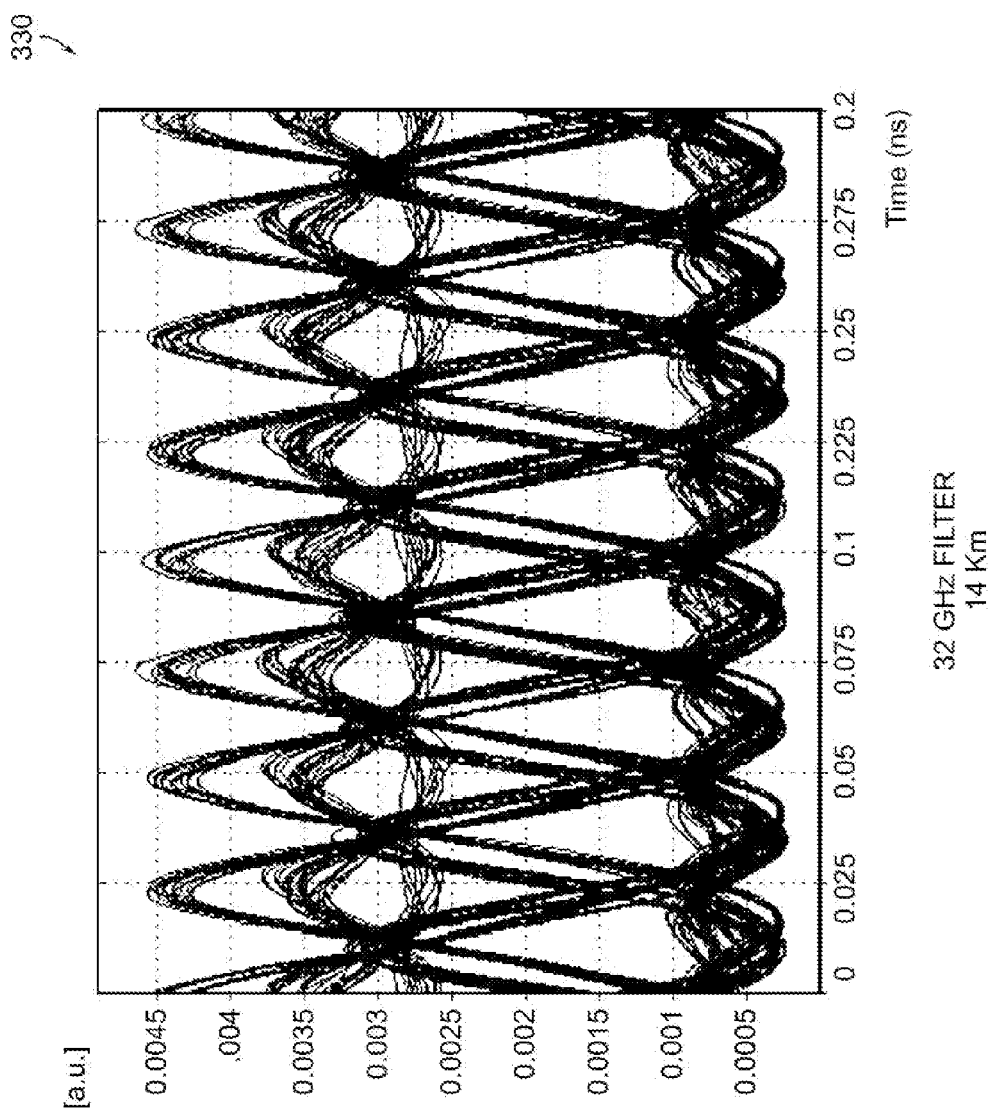
FIG. 3D presents a simulated eye diagram of a 40 Gbps DPSK signal after propagating through a 14 km optical link with a +240 psec/nm dispersion and being demodulated with a 32 GHz narrow band optical filter.

FIG. 3D presents a simulated eye diagram 330 of a 40 Gbps DPSK signal after propagating through a 14 km optical link with a +240 psec/nm dispersion and being demodulated with a 32 GHz narrow band optical filter. The simulated eye diagram 330 shows some inter-symbol interference due to dispersion, but the eyes are open enough to clearly distinguish the transmitted digital signal with most receivers.

Figure 3E:
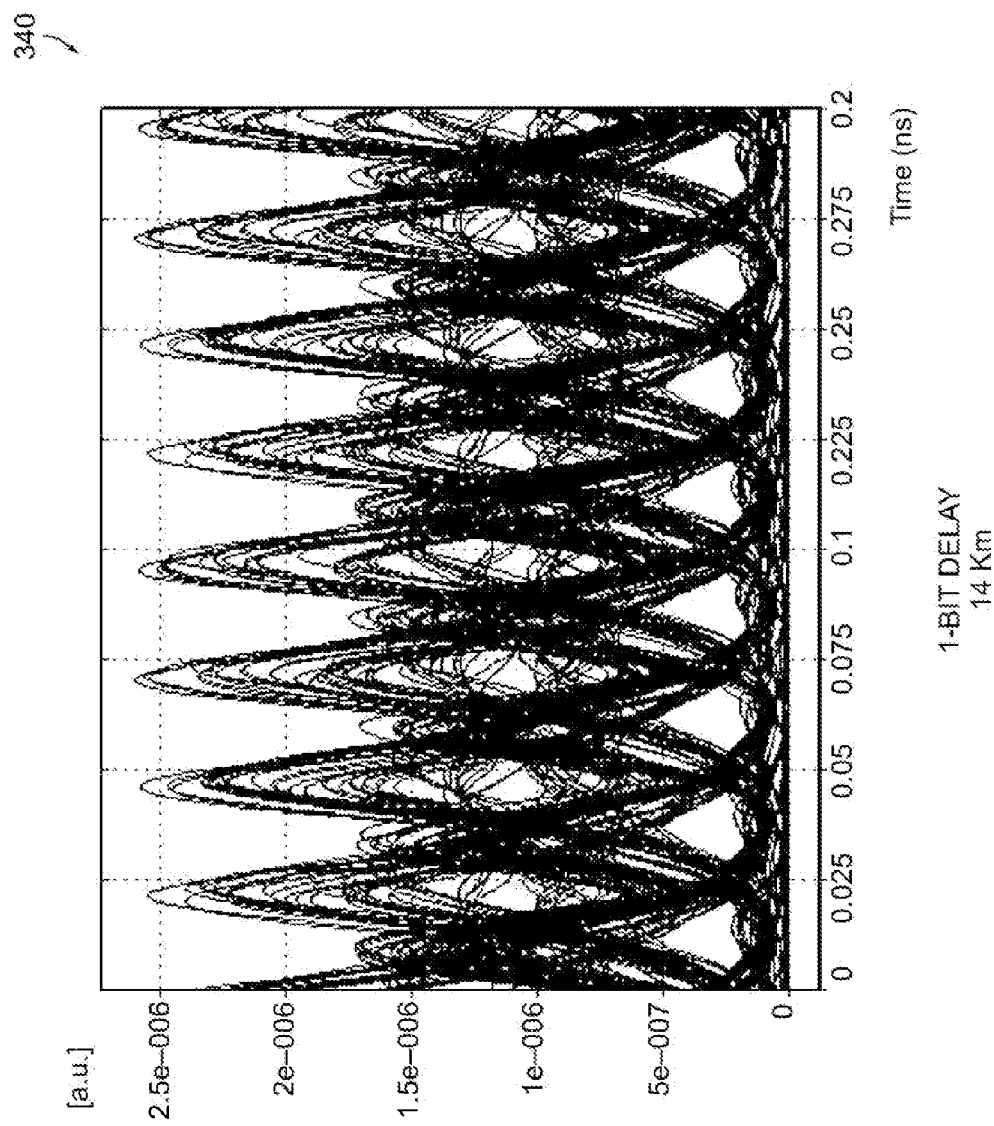
FIG. 3E presents a simulated eye diagram of a 40 Gbps DPSK signal after propagating through a 14 km optical link with a +240 psec/nm dispersion and being demodulated with a delay-interferometric demodulator having a standard 1-bit delay.

FIG. 3E presents a simulated eye diagram 340 of a 40 Gbps DPSK signal after propagating through a 14 km optical link with a +240 psec/nm dispersion and being demodulated with a delay-interferometric demodulator having a standard 1-bit delay. The simulated eye diagram 340 shows eyes that are completely closed in the center region indicating an unacceptably high inter-symbol interference due to dispersion. Most of the information in such a demodulated signal is lost. The open areas in the bottom of the eye diagram do not contain any useful information.

Figure 3F:
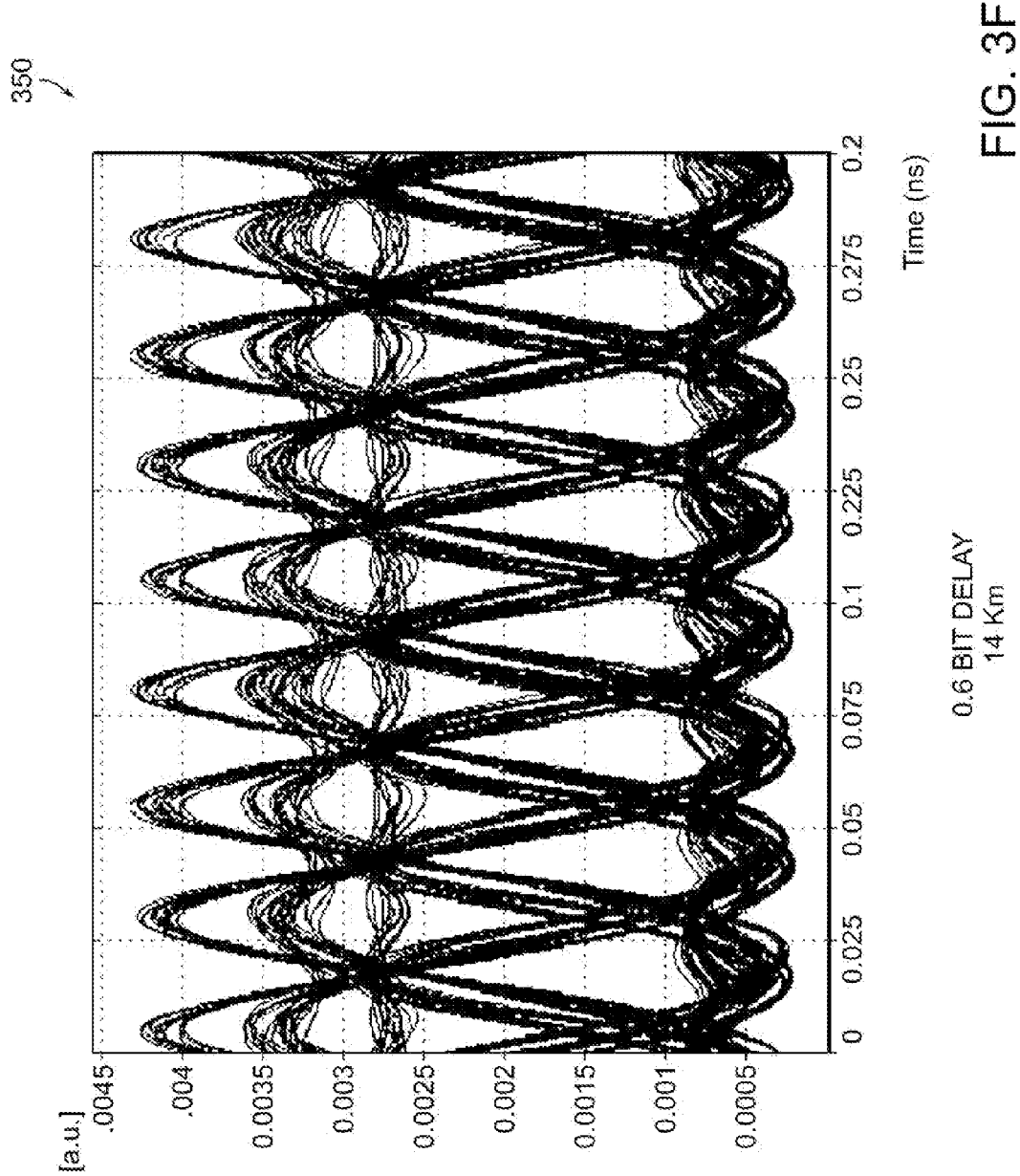
FIG. 3F presents a simulated eye diagram of a 40 Gbps DPSK signal after propagating through a 14 km optical link with a +240 psec/nm dispersion and being demodulated with a delay-interferometric demodulator having a 0.6-bit delay.

FIG. 3F presents a simulated eye diagram 350 of a 40 Gbps DPSK signal after propagating through a 14 km optical link and being demodulated with a delay-interferometric demodulator having a 0.6-bit delay, which has been determined to significantly reduce the effects of dispersion in the received signal. The simulated eye diagram 350 shows some inter-symbol interference due to dispersion, but there are clearly distinguished eyes that are open enough to distinguish the received digital signal with most receivers. The simulated eye diagram 350 is similar to the simulated eye diagram 330 for the demodulation with the 32 GHz narrow band optical filter that was described in connection with FIG. 3D.

Figure 4:
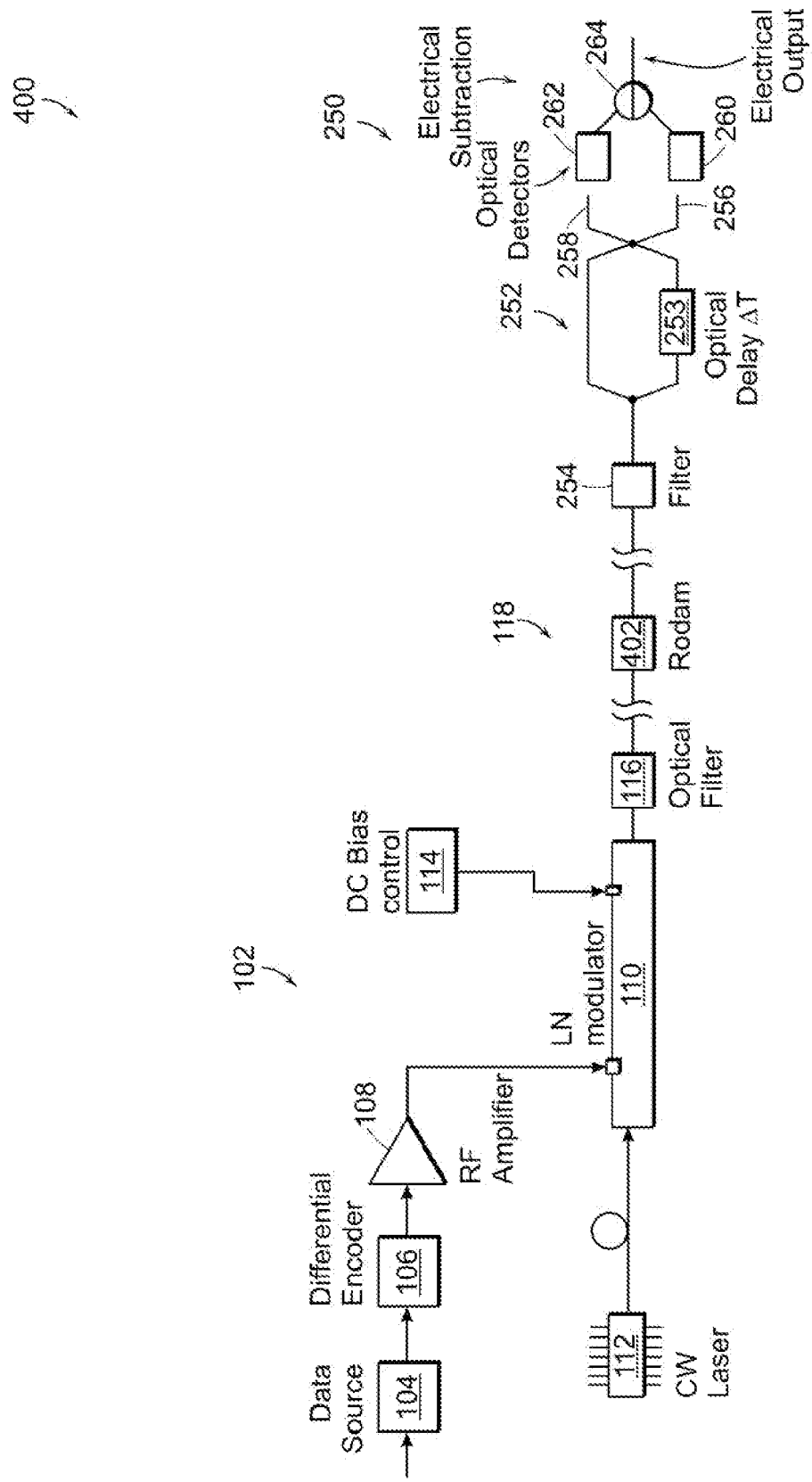
FIG. 4 illustrates a block diagram of a third embodiment of an optical communications system which mitigates the effects of dispersion by reducing or eliminating the portion of the optical spectrum that includes the dispersion imprint of the optical link by using a Reconfigurable Optical Add Drop Multiplexer (ROADM).

FIG. 4 illustrates a block diagram of a third embodiment of an optical communications system 400 which mitigates the effects of dispersion by reducing or eliminating the portion of the optical spectrum that includes the dispersion imprint of the optical link by using a Reconfigurable Optical Add Drop Multiplexer (ROADM). The optical communications system 400 is similar to the optical communications system 200 described in connection with FIG. 2. However, the optical communications system 400 includes at least one ROADM 402 that is operated to reduce the effects of dispersion.

Reconfigurable optical add drop multiplexers are optical elements that can be deployed throughout an optical network as a way of rerouting optical signals. These devices are well known in the art. Some particular ROADMs, such as those sold by Optium Corporation of Horsham, Pa., the assignee of the present invention, include optical filtering functionality in addition to optical switching functionality. These particular ROADM devices use Liquid Crystal on Silicon (LCOS) technology. By precisely controlling the voltage on the LCOS devices in these ROADMs, the user can generate a diffraction pattern that can perform optical filtering for bandwidth optimization according to the present invention. In addition, these ROADM devices can incorporate a linear phase across the band pass filter response, which can be used to add a predetermined amount of chromatic dispersion to the optical spectrum to compensate for dispersion in the modulated optical signal that occurs during transmission through the optical link 118.

The methods and apparatus of mitigating the effects of chromatic dispersion in the optical fiber link according to the present invention can work with various modulation formats and at various data rates. Data is presented for the DPSK modulation format. However, one skilled in the art will appreciate that the methods and apparatus of the present invention are not limited to using only the DPSK modulation format and that other modulation formats, such as RZ, NRZ, and Duo-Binary can be used. In addition, one skilled in the art will appreciate that the methods and apparatus of the present invention are not limited to application where data is transmitted at 10 and 40 Gbps.

Figure 5:
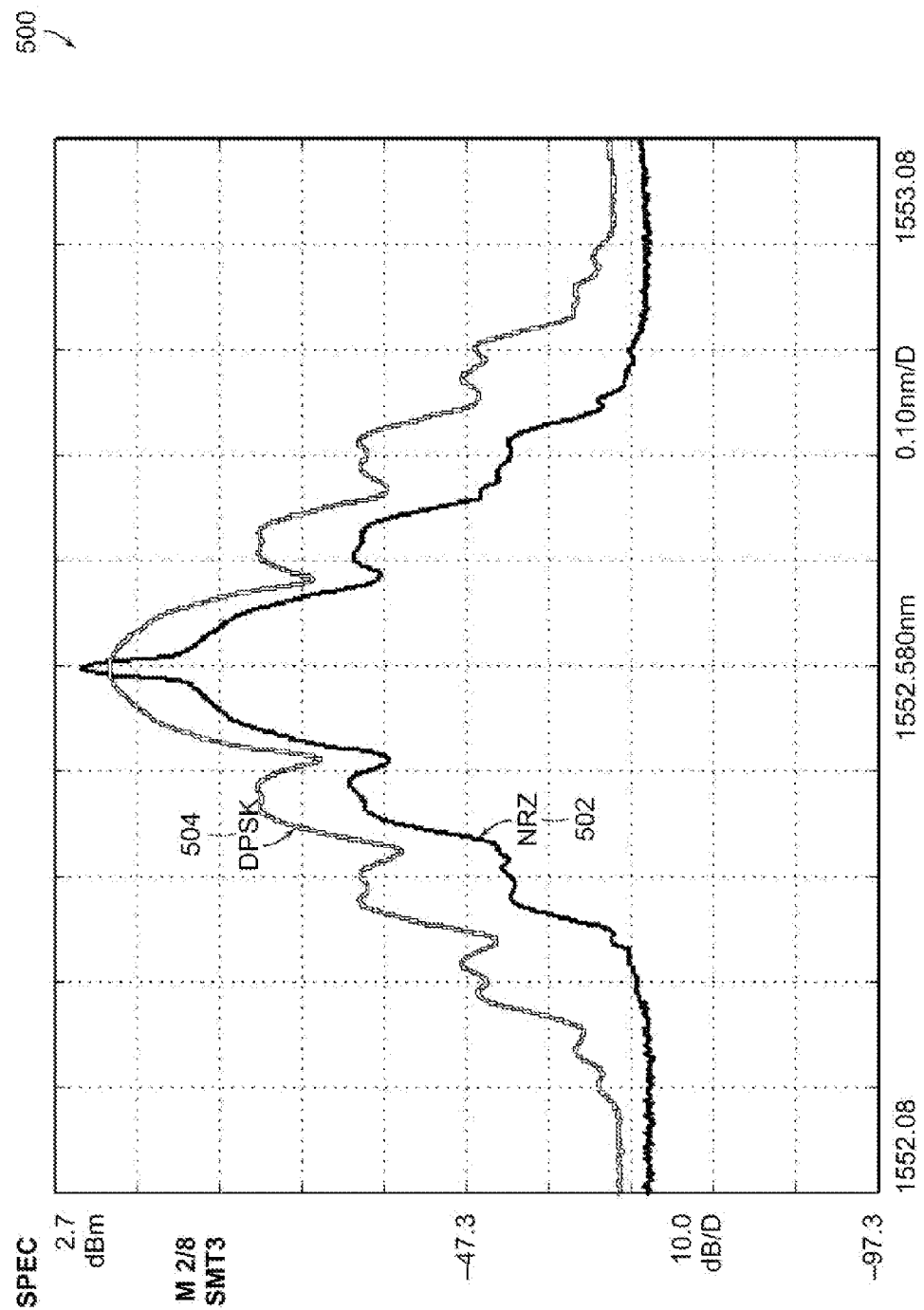
FIG. 5 presents an optical spectrum that compares a 10 Gbps NRZ data spectrum with a DPSK data spectrum before propagation through the optical network.

FIG. 5 presents an optical spectrum 500 that compares a 10 Gbps NRZ data spectrum 502 with a DPSK data spectrum 504 before propagation through the optical network. The optical spectrum 500 indicates that the DPSK modulation format has a relatively large optical bandwidth, which results in a relatively high tolerance to optical fiber non-linearities. This relatively high tolerance of optical fiber non-linearity allows the use of high power optical signals. Using high power optical signals results in transmitted optical signals that have relatively high signal-to-noise ratio at the receiver. However, the relatively large optical bandwidth of DPSK modulated signals also causes a significant chromatic dispersion penalty in known optical communications systems.

Figure 6A:
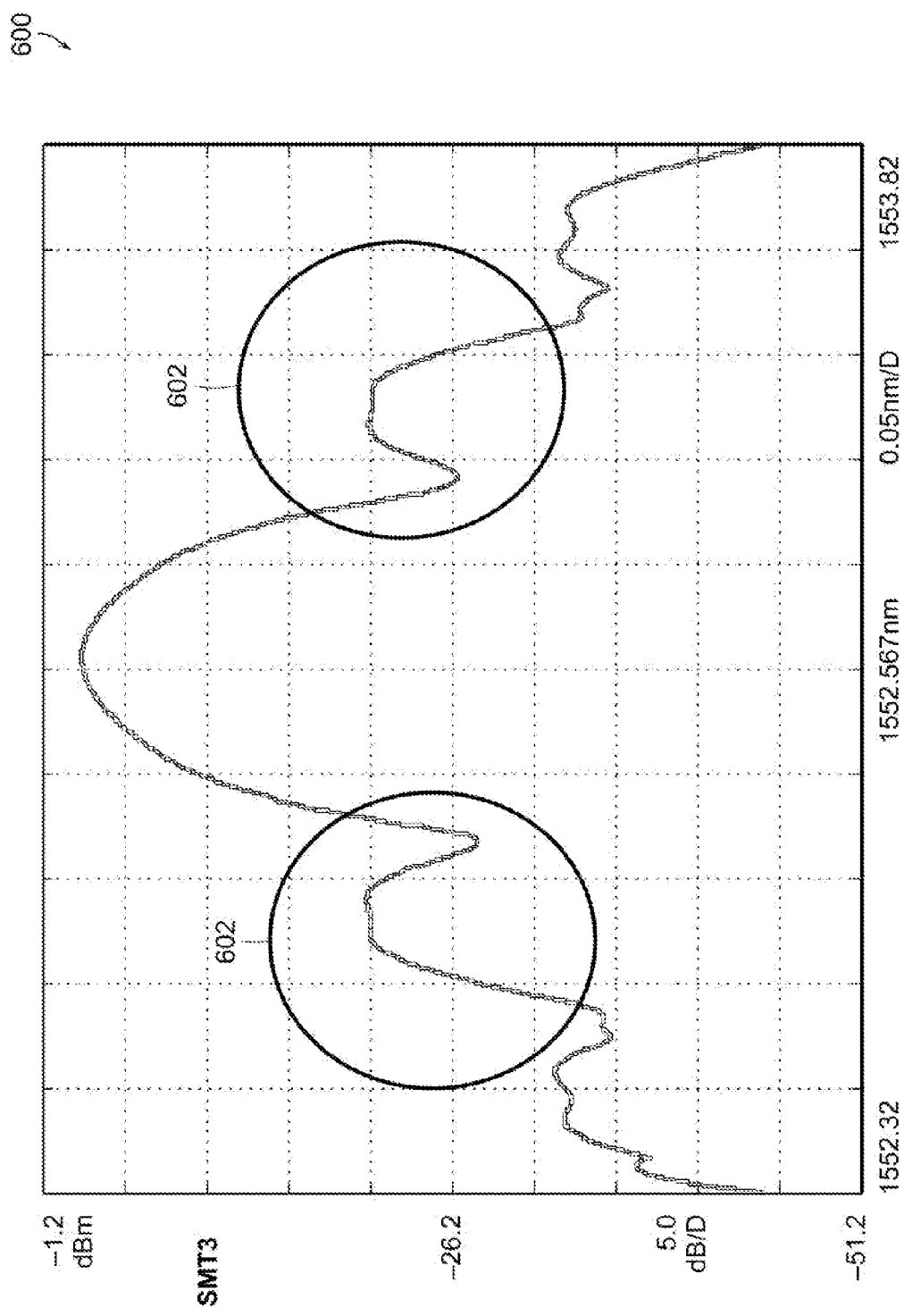
FIG. 6A presents a 10 Gbps DPSK data optical pulse spectrum after generation by a DPSK transmitter and transmission through the optical link, but before optical filtering.
Figure 6B:
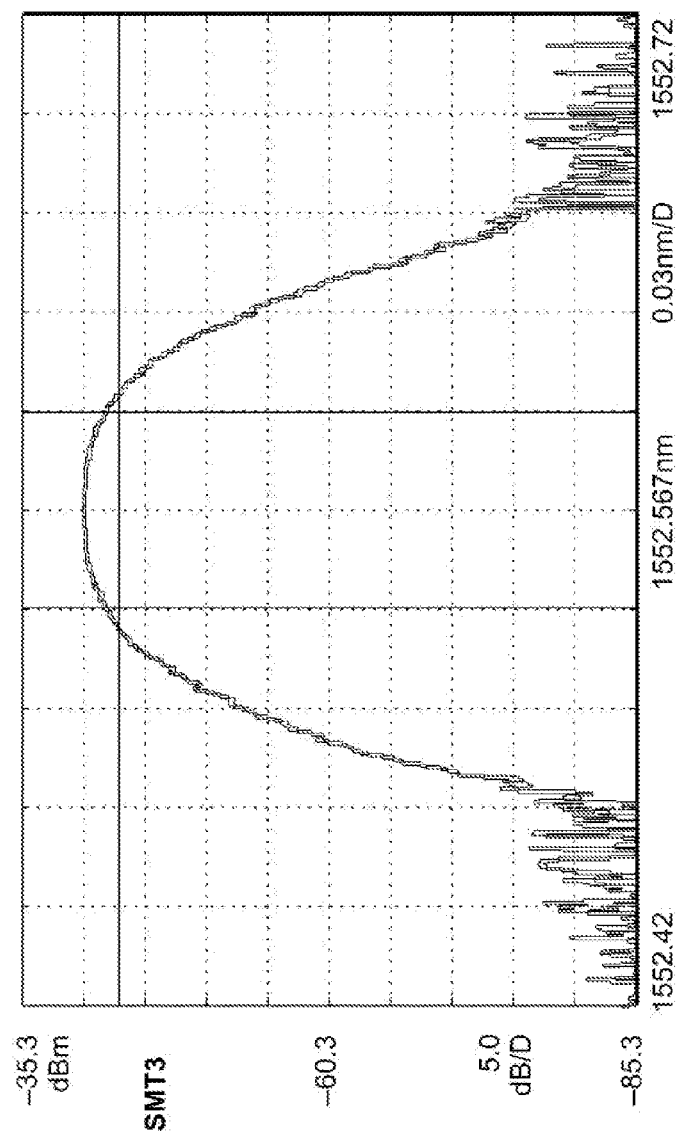
FIG. 6B presents an optical filter spectrum having a passband chosen to remove the second-order part of the DPSK data pulse spectrum presented in FIG. 6A.
Figure 6C:
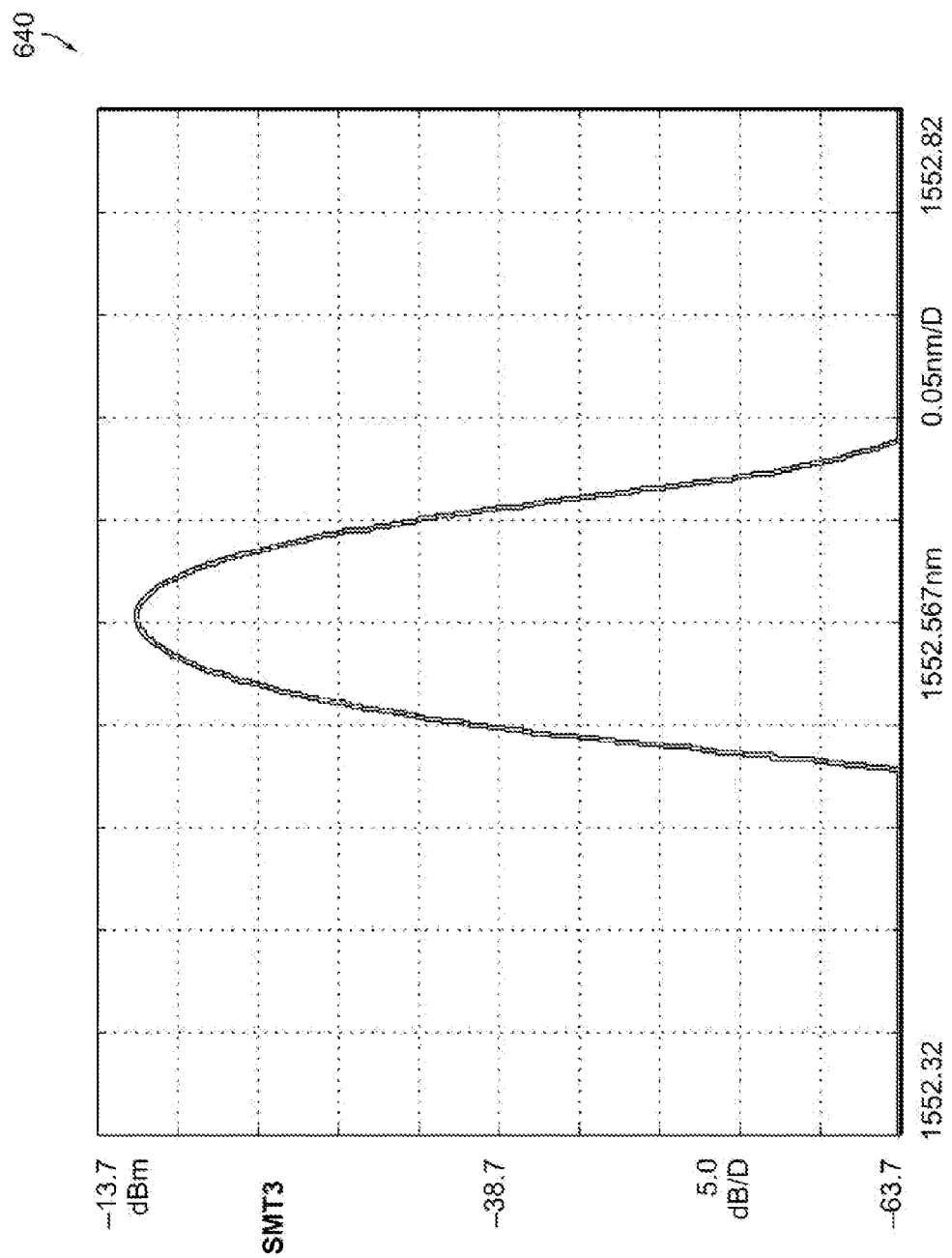
FIG. 6C presents a filtered DPSK data pulse spectrum that was filtered by an optical filter with the optical filter spectrum presented in FIG. 6B.

FIGS. 6A-6C present DPSK spectrum that illustrates how filtering and demodulation according to the present invention reduce or eliminate the portion of the optical spectrum carrying the dispersion imprint of the optical link. FIG. 6A presents a 10 Gbps DPSK data optical pulse spectrum after generation by a DPSK transmitter and transmission through the optical link, but before optical filtering. The DPSK optical spectrum 600 illustrates regions 602 that exhibit second-order non-linearities that will cause pulse broadening due to dispersion in the optical link. Most direct detection receivers use square law detectors that square the signal. Any imbalance in the received optical spectrum will degrade performance and will cause the received electrical eye to have significant distortions. Filtering regions of the spectrum with higher order effects that cause the degraded performance can be used to reduce or eliminate these distortions in the optical spectrum. Filtering these spectral regions 602 will greatly improve the optical system tolerance to system non-linearity, in particular, chromatic dispersion.

FIG. 6B presents an optical filter spectrum 620 having a passband chosen to remove the second-order part of the DPSK data pulse spectrum 600 shown in FIG. 6A. The particular filter used is an 8 GHz passband filter. FIG. 6C presents the filtered DPSK data pulse spectrum 640 that was filtered by an optical filter with the optical filter spectrum 620 presented in FIG. 6B. FIGS. 6A-6C show that optical filtering and optical demodulation according to the present invention can reduce or eliminate the portion of the optical spectrum in the DPSK data pulse that carries the dispersion imprint of the optical link.

Figure 7A:
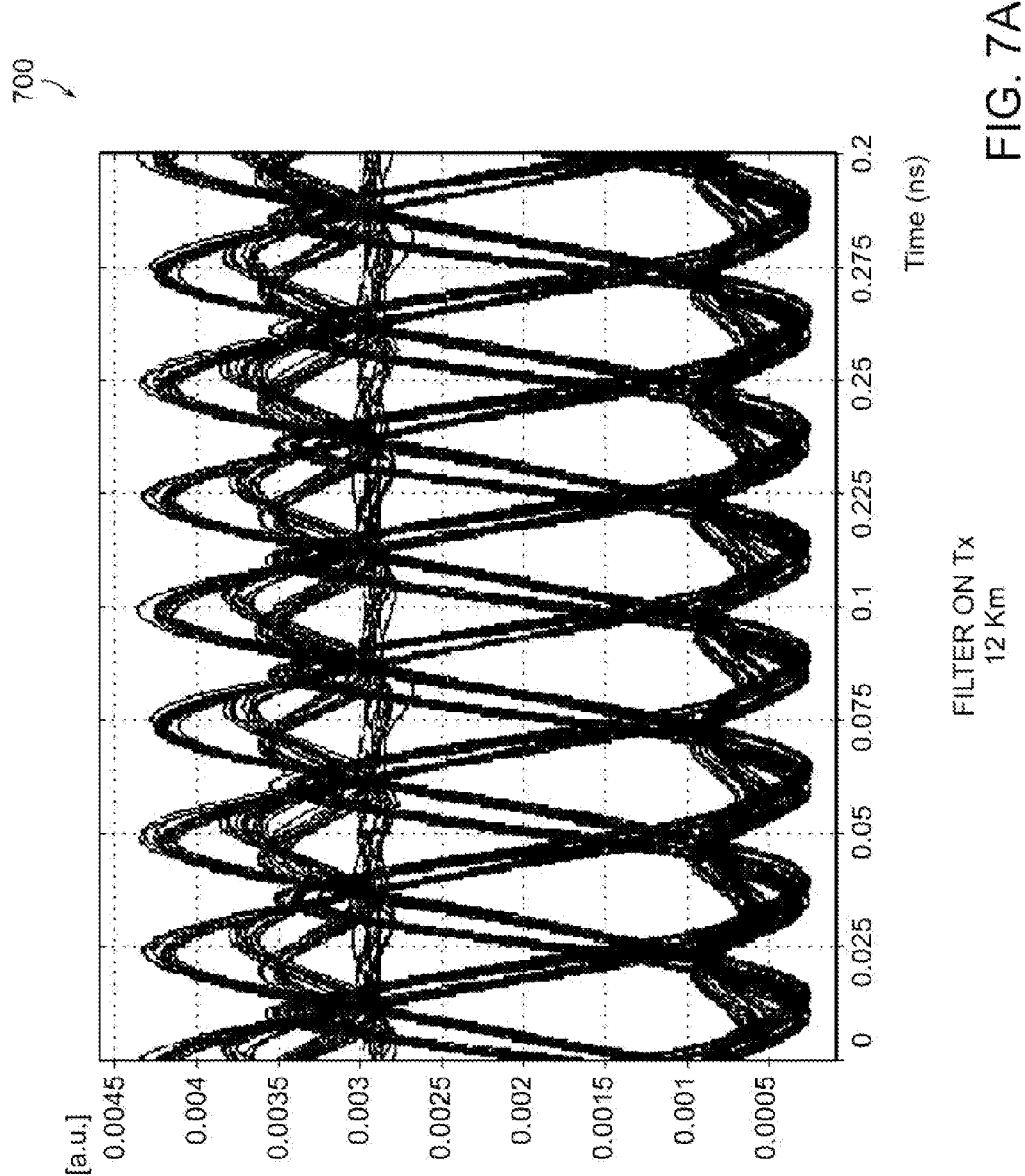
FIG. 7A presents a simulated eye diagram of a 40 Gbps DPSK signal that was filtered by a 32 GHz narrow band optical filter according to the present invention on the transmitter side and then transmitted through a 12 km optical link with a +210 psec/nm dispersion.
Figure 7B:
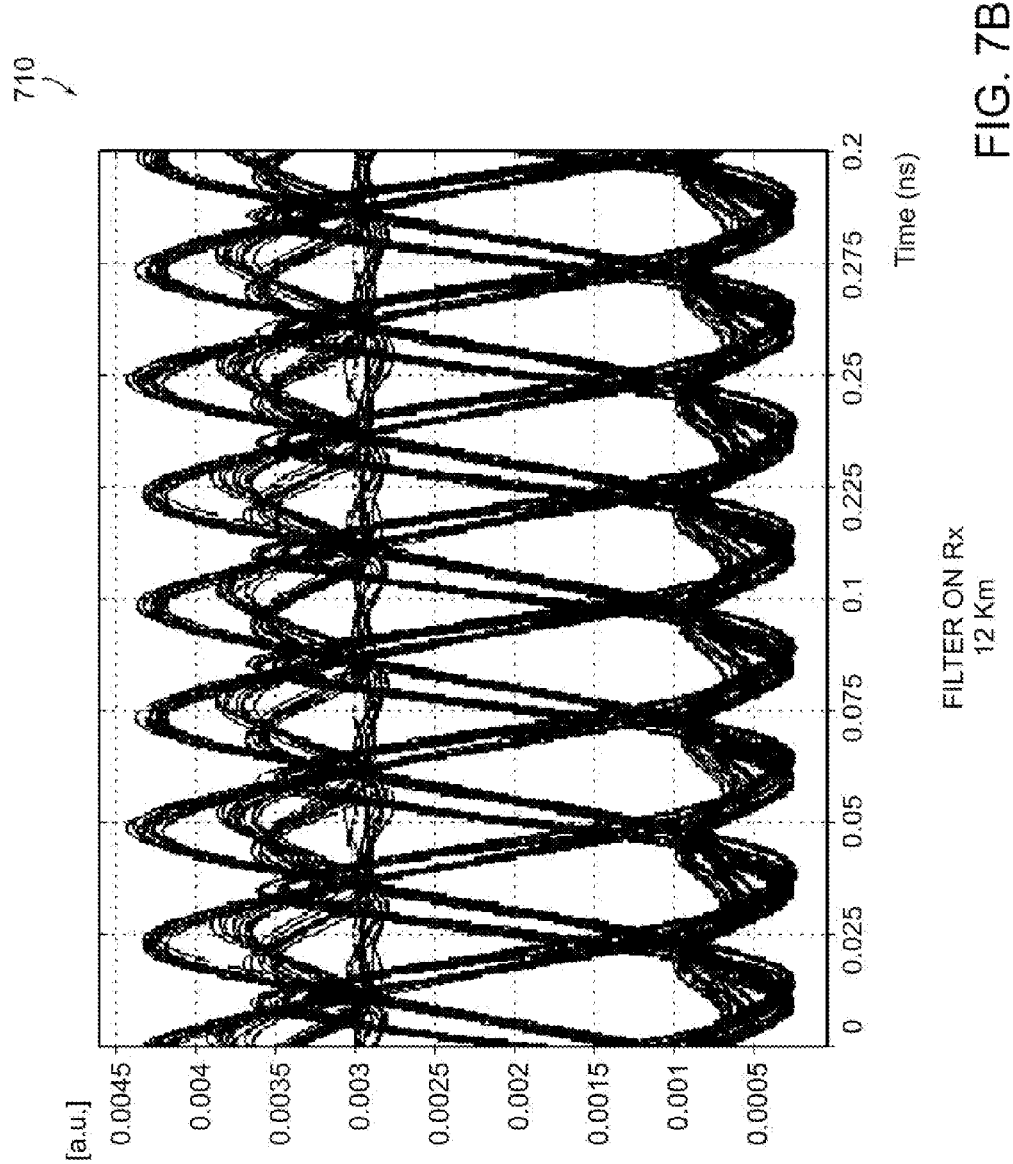
FIG. 7B presents a simulated eye diagram of a 40 Gbps DPSK signal after propagating through a 12 km optical link with a +210 psec/nm dispersion and being demodulated with a 32 GHz narrow band optical filter according to the present invention.

FIG. 7 illustrates a comparison between narrow optical filtering on the transmitter side and narrow optical filtering on the receiver side of an optical communications system according to the present invention. FIG. 7A presents a simulated eye diagram 700 of a 40 Gbps DPSK signal that was filtered by a 32 GHz narrow band optical filter according to the present invention on the transmitter side and then transmitted through a 12 km optical link with a +210 psec/nm dispersion. FIG. 7B presents a simulated eye diagram 710 of a 40 Gbps DPSK signal after propagating through a 12 km optical link with a +210 psec/nm dispersion and being demodulated with a 32 GHz narrow band optical filter according to the present invention. The eye diagrams 700 and 710 in FIGS. 7A and 7B indicate that optical filtering according to the present invention, which mitigates the effects of dispersion of the modulated optical signal, can be performed on either the transmitter side or the receiver side of the optical communications system.

Figure 8A:
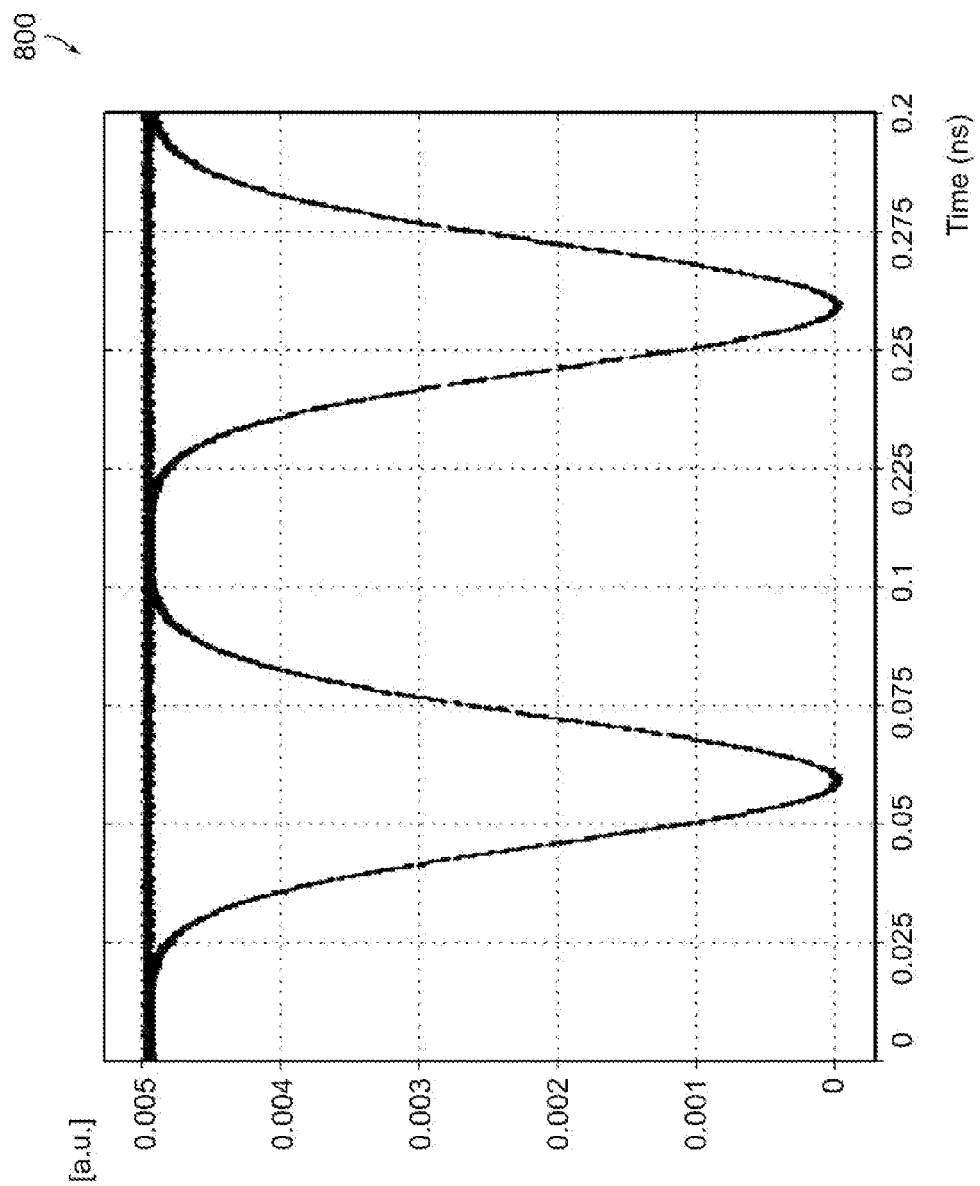
FIG. 8A presents a simulated eye diagram of a 10 Gbps data stream generated by a transmitter before filtering and transmission through the optical link.
Figure 8B:
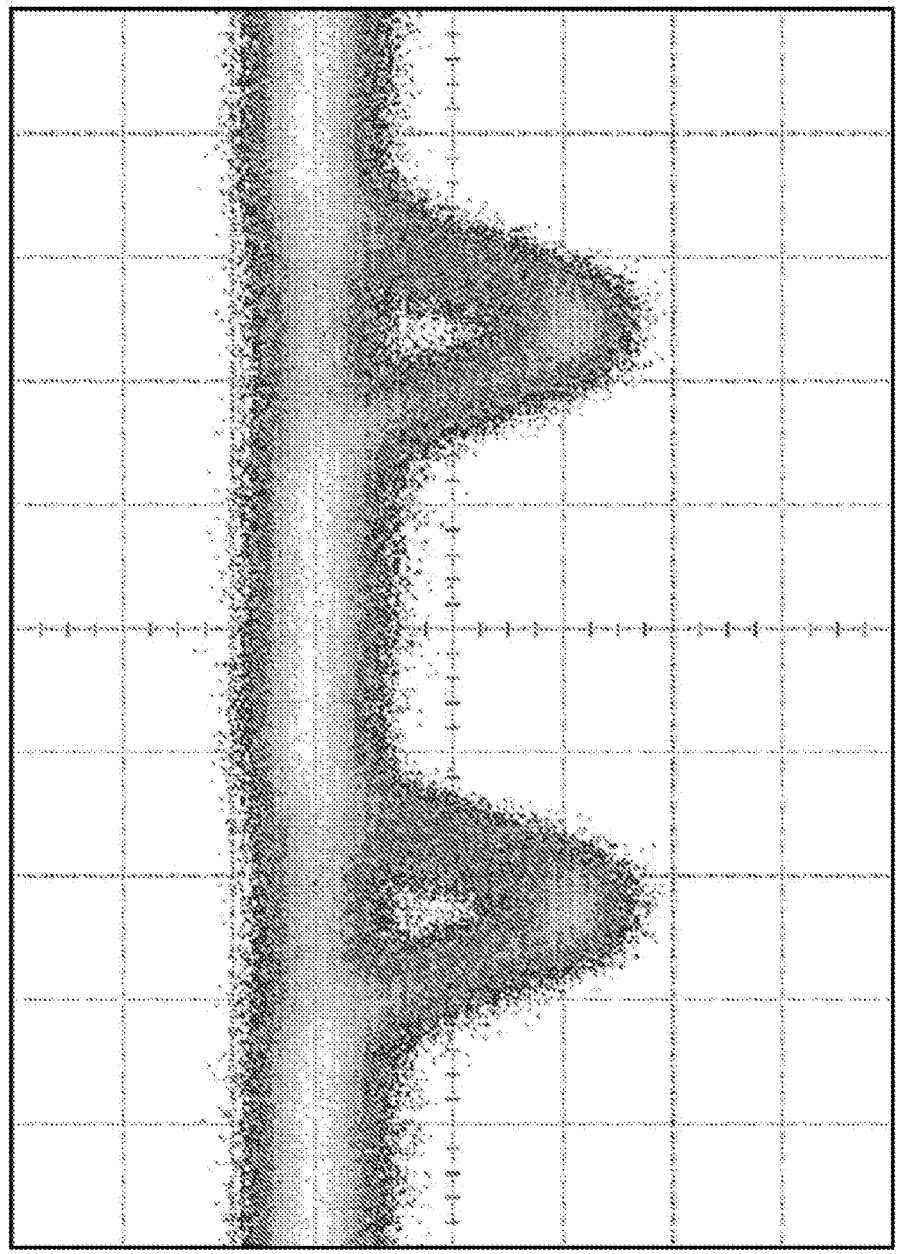
FIG. 8B presents a corresponding measured eye diagram of a 10 Gbps data stream generated by a transmitter before filtering and transmission through the optical link.

FIGS. 8A-8E illustrate simulated and measured eye diagrams for 10 Gbps data streams generated and transmitted under different conditions. FIG. 8A illustrates a simulated eye diagram 800 of a 10 Gbps data stream generated by a transmitter before filtering and transmission through the optical link. The simulated optical spectrum 800 of the 10 Gbps data stream has no dispersion imprint from the optical link. FIG. 8B illustrates a corresponding measured eye diagram 810 of a 10 Gbps data stream generated by a transmitter before filtering and transmission through the optical link. The corresponding measured spectrum 810 of the 10 Gbps data stream also has no dispersion imprint from the optical link. The simulated eye diagram 800 closely matches the corresponding measured eye diagram 810.

Figure 8C:
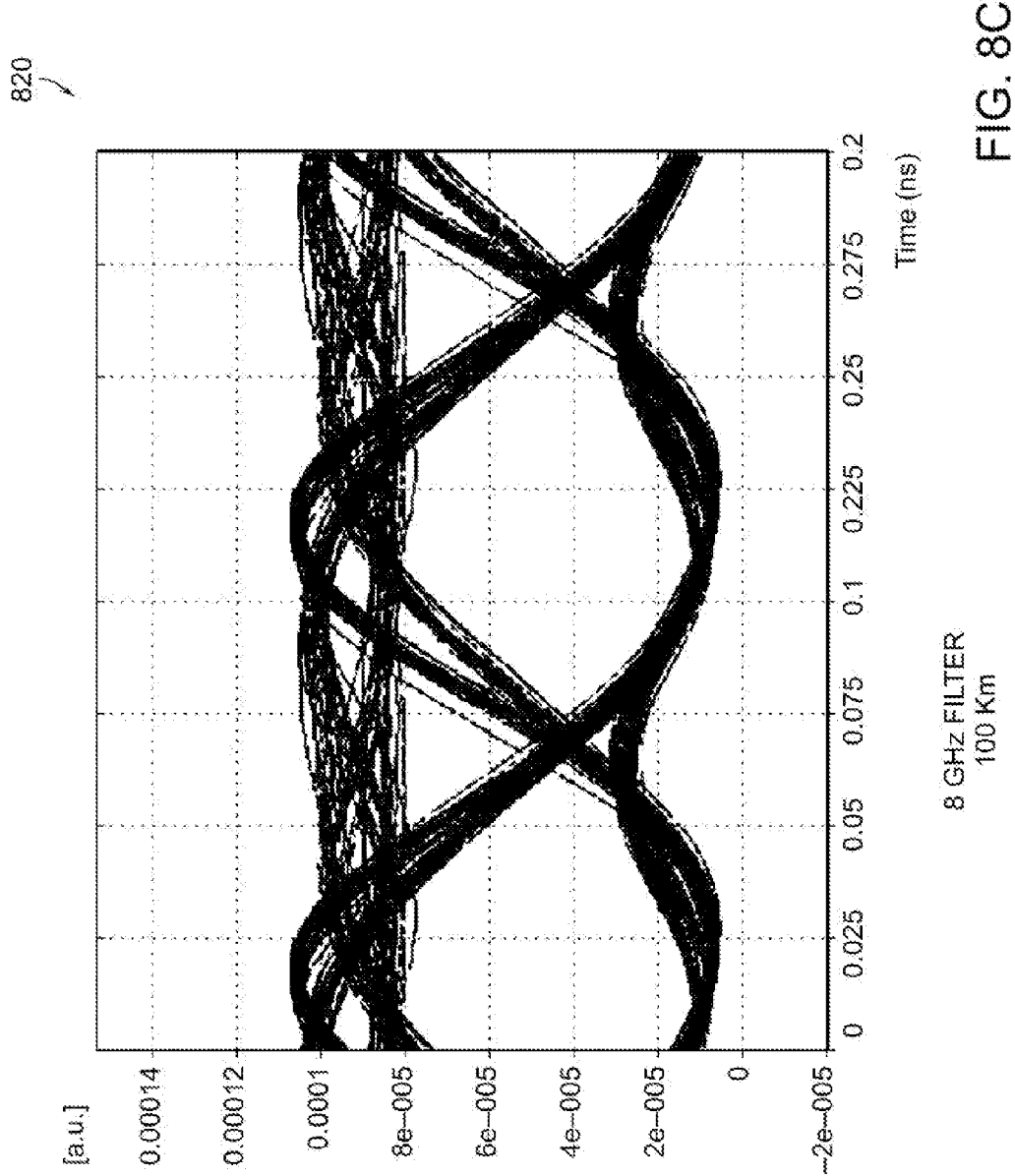
FIG. 8C presents a simulated eye diagram of a 10 Gbps data stream transmitted through a 96 km optical fiber link with a +1,600 psec/nm dispersion and demodulated with an 8 GHz optical filter according to the present invention.
Figure 8D:
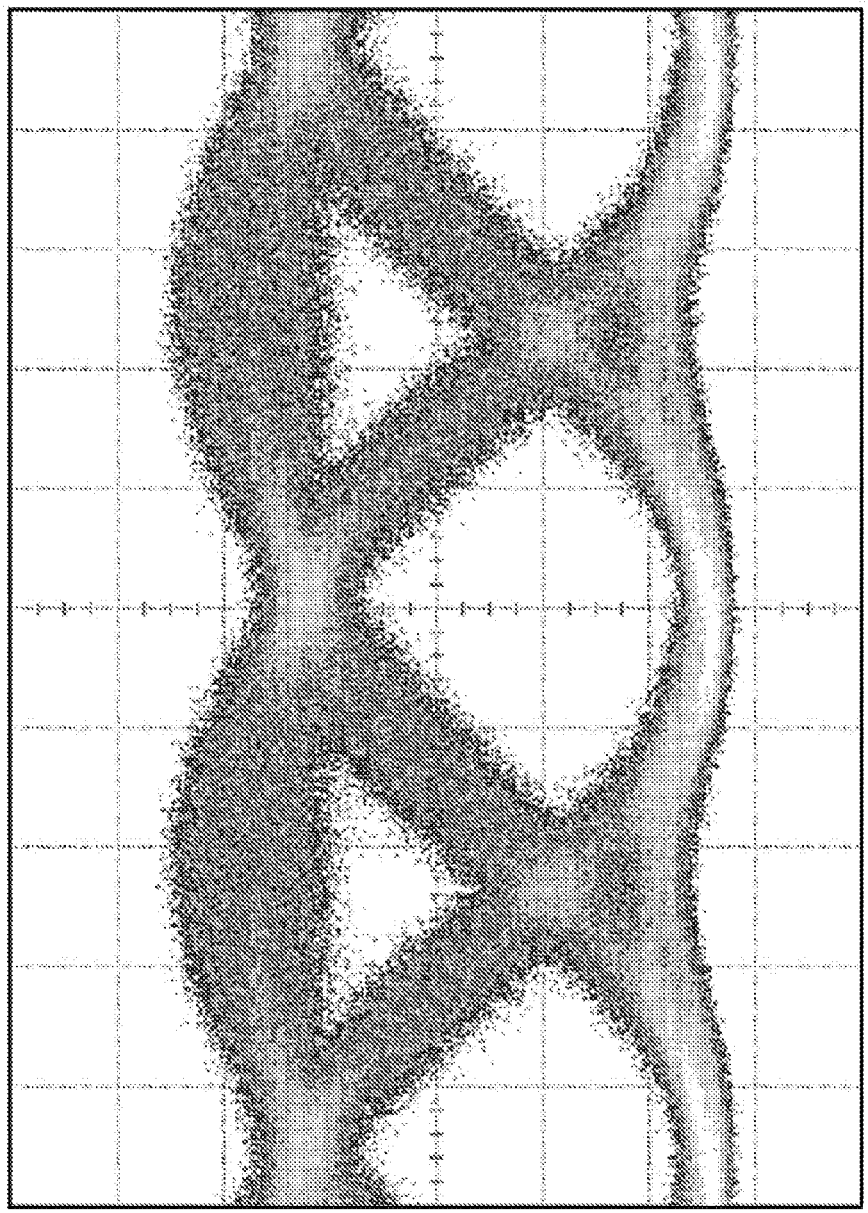
FIG. 8D presents a corresponding measured eye diagram of a 10 Gbps data stream transmitted through a 96 km optical fiber link with a +1,600 psec/nm dispersion and demodulated with an 8 GHz optical filter according to the present invention.

FIG. 8C illustrates a simulated eye diagram 820 of a 10 Gbps data stream transmitted through a 96 km optical fiber link with a +1,600 psec/nm dispersion and demodulated with an 8 GHz optical filter according to the present invention. FIG. 8D illustrates a corresponding measured eye diagram 830 of a 10 Gbps data stream transmitted through a 96 km optical fiber link with a +1,600 psec/nm dispersion and demodulated with an 8 GHz optical filter according to the present invention. The simulated eye diagram 820 closely matches the corresponding measured eye diagram 830. In addition, both the simulated eye diagram 820 and the corresponding measuring eye diagram 830 show minimal inter-symbol interference due to dispersion.

Figure 8E:
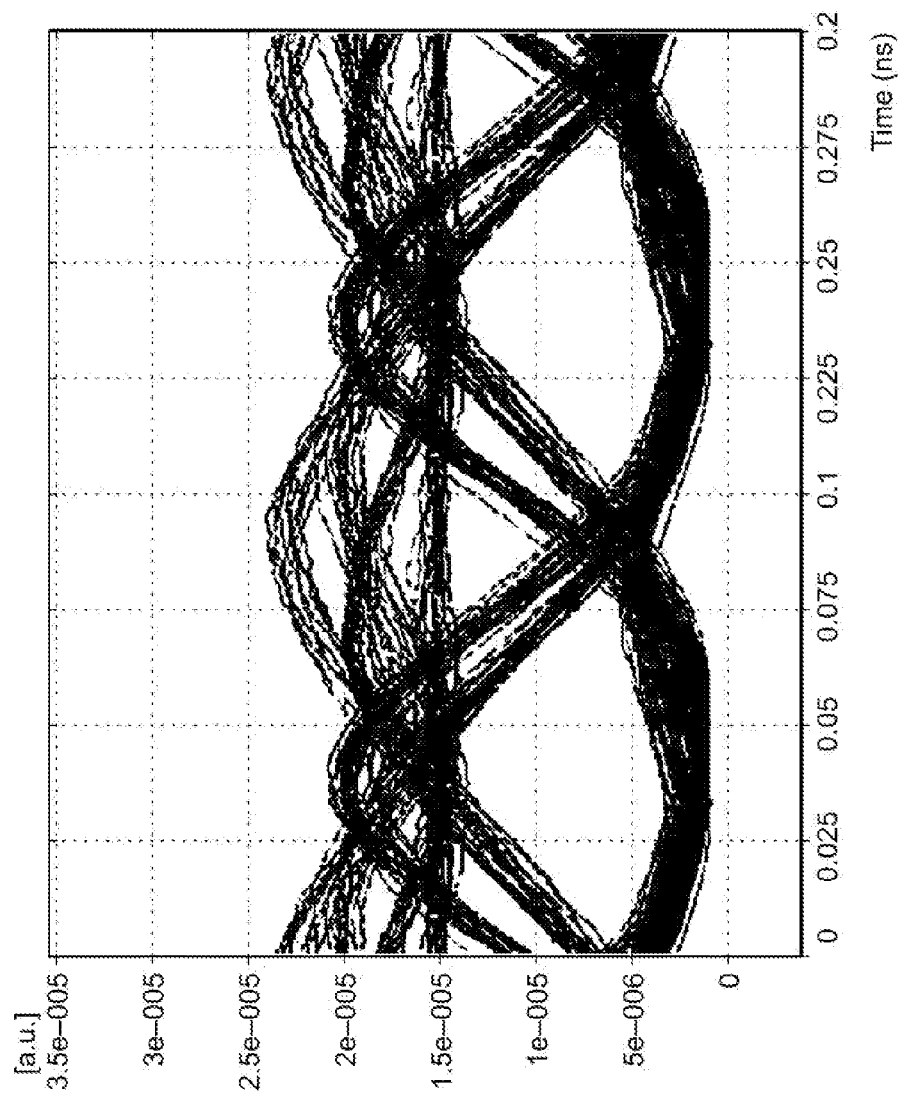
FIG. 8E presents a simulated eye diagram of a 10 Gbps data stream transmitted through a 175 km optical fiber link with a +3,000 psec/nm dispersion and demodulated with an 8 GHz optical filter according to the present invention.
Figure 8F:
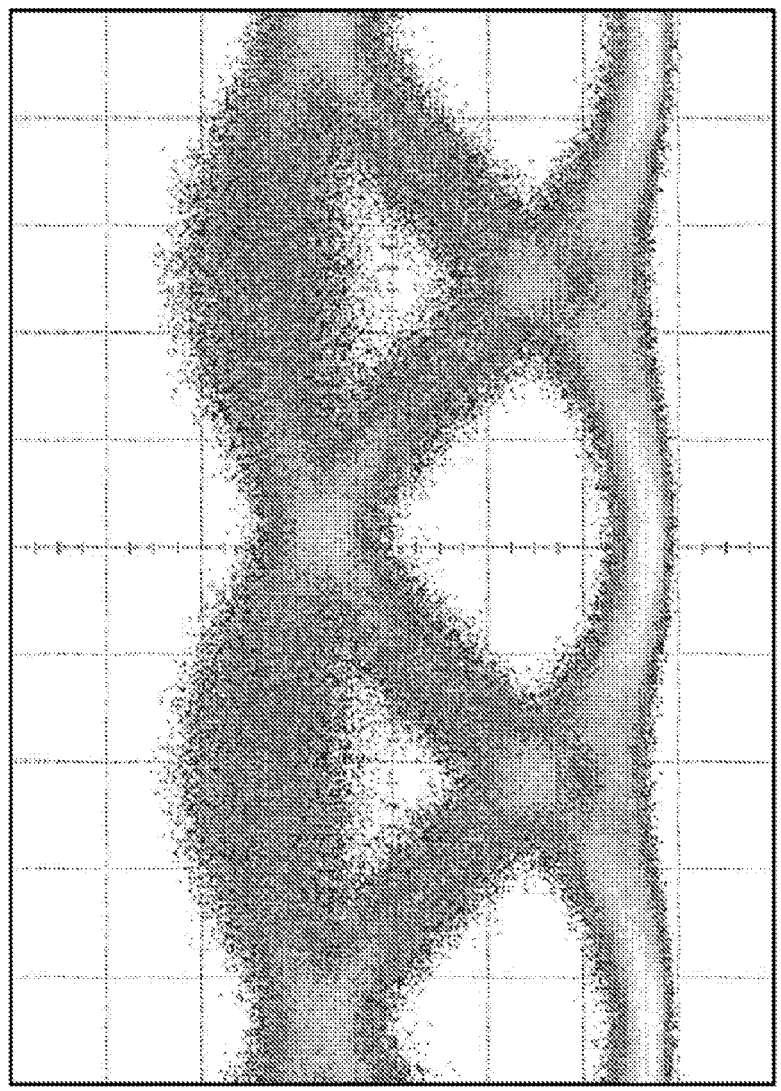
FIG. 8F presents a corresponding measured eye diagram of a 10 Gbps data stream transmitted through a 175 km optical fiber link with a +3,000 psec/nm dispersion and demodulated with an 8 GHz optical filter according to the present invention.

FIG. 8E illustrates a simulated eye diagram 840 of a 10 Gbps data stream transmitted through a 175 km optical fiber link with a +3,000 psec/nm dispersion and demodulated with an 8 GHz optical filter according to the present invention. FIG. 8F illustrates a corresponding measured eye diagram 850 of a 10 Gbps data stream transmitted through a 175 km optical fiber link with a +3,000 psec/nm dispersion and demodulated with an 8 GHz optical filter according to the present invention. The simulated eye diagram 840 closely matches the corresponding measured eye diagram 850. In addition, both the simulated eye diagram 840 and the corresponding measuring eye diagram 850 also show minimal inter-symbol interference due to dispersion.

Thus, FIGS. 8A-8E illustrate a close correlation between simulated and measured eye diagrams for 10 Gbps data streams transmitted and received according to the present methods of the invention. Similar correlations between simulated and measured eye diagrams for 40 Gbps data streams transmitted and received according to the present methods of the invention can be obtained.

Therefore, the methods and apparatus of the present invention mitigate the effects of dispersion in the modulated optical signal by using narrow band optical filtering and/or optimizing the optical demodulation. The methods and apparatus of the present invention can be used with any type of modulated optical signal having second-order and higher-order dispersion characteristics, such as DPSK, RZ, NRZ, and DuoBinary modulated optical signals. Receivers according to the present invention optimize the demodulated optical signals and generate normal binary-valued signals that can be detected with a conventional optical detector, while also providing high dispersion tolerance. The improvement in the dispersion tolerance comes from eliminating the portion of the optical spectrum carrying a substantial fraction of the dispersion imprint of the optical link.

In addition, one skilled in the art will appreciate that the various methods of mitigating the effects of dispersion according to the present invention are not exclusive methods that can only work independently. Instead, the various methods of mitigating the effects of dispersion in the modulated optical signal according to the present invention can be used separately or in any combination. For example, both narrow optical filtering and optimized demodulation can be used together to mitigate the effects of dispersion in the modulated optical signal. In addition, the optical filtering can be performed using optical filters anywhere in the optical communications systems, such as in the transmitter end, optical link or transmission system, and in the receiver end. Furthermore, one or more reconfigurable optical add drop multiplexer positioned in the optical link can be positioned anywhere in the optical link to provide optical filtering.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention.

What is claimed is:

1. An optical communications system comprising:
    a. an optical transmitter that generates a modulated optical signal at an output;
    b. an optical link having an input that is optically coupled to the output of the optical transmitter, the modulated optical signal propagating through the optical link so that the dispersion of the optical link is imprinted onto an optical spectrum of the modulated optical signal;
    c. an optical filter that is optically coupled between the output of the optical transmitter and the input of the optical link, the optical filter reducing second-order non-linearities that result in dispersion in the modulated optical signal during transmission through the optical link;
    d. a demodulator having an input that is optically coupled to an output of the optical link, the demodulating receiving the modulated optical signal propagated through the optical link and filtering at least a portion of the optical spectrum with the imprinted dispersion of the optical link, thereby mitigating effects of dispersion in the modulated optical signal and generating a demodulated optical signal at an output; and
    e. an optical detector having an input that is optically coupled to the output of the demodulator, the optical detector generating an electrical data signal.

2. The optical communications system of claim 1 wherein the modulated optical signal comprises a DPSK modulated optical signal.

3. The optical communications system of claim 1 wherein the modulated optical signal comprises a NRZ optical signal.

4. The optical communications system of claim 1 wherein the modulated optical signal comprises an RZ optical signal.

5. The optical communications system of claim 1 wherein the modulated optical signal comprises a DuoBinary optical signal.

6. The optical communications system of claim 1 further comprising an optical filter that is optically coupled between the output of the optical link and the input of the demodulator, the optical filter filtering at least a portion of the optical spectrum with the imprinted dispersion of the optical link, thereby mitigating effects of dispersion in the modulated optical signal.

7. The optical communications system of claim 1 wherein the demodulator comprises a narrow band optical filter demodulator.

8. The optical communications system of claim 1 wherein the demodulator comprises a delay-interferometric demodulator.

9. The optical communications system of claim 8 wherein a delay of the delay-interferometric demodulator is less than a 1-bit delay.

10. The optical communications system of claim 8 wherein a delay of the delay-interferometric demodulator is in the range of about a 0.55-bit delay to a 0.75-bit delay.

11. The optical communications system of claim 1 wherein the demodulator comprises an in-balance interferometric demodulator having arms that propagate mismatched amplitudes.

12. An optical communications system comprising:
    a. an optical transmitter that generates a modulated optical signal at an output;
    b. an optical link having an input that is optically coupled to the output of the optical transmitter, the modulated optical signal propagating through the optical link so that the dispersion of the optical link is imprinted onto an optical spectrum of the modulated optical signal;
    c. an optical filter that is optically coupled between the output of the optical transmitter and the input of the optical link, the optical filter reducing non-linearities that result in dispersion in the modulated optical signal during transmission through the optical link;
    d. a reconfigurable optical add drop multiplexer positioned in the optical link that generates a diffraction pattern which filters at least a portion of the optical spectrum of the modulated optical signal with the imprinted dispersion of the optical link, wherein the reconfigurable optical add drop multiplexer generates a diffraction pattern that provides a phase shift which causes a predetermined amount of dispersion that compensates for dispersion in the optical modulation signal during transmission through the optical link;
    e. a demodulator having an input that is optically coupled to an output of the optical link, the demodulating receiving the modulated optical signal propagated through the optical link and generating a demodulated optical signal at an output; and
    f. an optical detector having an input that is optically coupled to the output of the demodulator, the optical detector generating an electrical data signal.

13. The optical communications system of claim 12 wherein the reconfigurable optical add drop multiplexer comprises a liquid crystal on silicon reconfigurable optical add drop multiplexer.

14. The optical communications system of claim 12 further comprising an optical filter that is optically coupled between the output of the optical link and the input of the demodulator, the optical filter filtering at least a portion of the optical spectrum with the imprinted dispersion of the optical link, thereby mitigating effects of dispersion in the modulated optical signal.

15. The optical communications system of claim 12 wherein the demodulator comprises a narrow band optical filter demodulator.

16. The optical communications system of claim 12 wherein the demodulator comprises a delay-interferometric demodulator.

17. The optical communications system of claim 16 wherein a delay of the delay-interferometric demodulator is less than a 1-bit delay.

18. The optical communications system of claim 17 wherein the demodulator comprises an in-balance interferometric demodulator having arms that propagate mismatched amplitudes.

19. A method of mitigating effects of dispersion in an optical communications system, the method comprising:
   a. generating a modulated optical signal at an output;
   b. optical filtering the modulated optical signal to reducing non-linearities that will result in dispersion in the modulated optical signal during transmission through an optical link;
   c. propagating the modulated optical signal through the optical link, the dispersion of the optical link being imprinted onto an optical spectrum of the modulated optical signal;
   d. filtering at least a portion of the optical spectrum with the imprinted dispersion of the optical link by generating a diffraction pattern along the optical link with a reconfigurable optical add drop multiplexer that provides a phase shift which causes a predetermined amount of dispersion that compensates for dispersion in the optical modulation signal during transmission through the optical link;
   e. demodulating the optical signal; and
   f. generating an electrical signal from the demodulated optical signal.

20. The method of claim 19 wherein the filtering at least a portion of the optical spectrum with the imprinted dispersion of the optical link comprises reducing second-order non-linearities in the modulated optical signal that result in pulse broadening in the optical modulation signal during transmission through the optical link.

21. The method of claim 19 wherein the filtering at least a portion of the optical spectrum with the imprinted dispersion of the optical link comprises introducing a linear phase shift across a pass band associated with the filtering.

22. The method of claim 19 wherein the filtering at least a portion of the optical spectrum with the imprinted dispersion of the optical link comprises demodulating the modulated optical signal with a narrow band optical filter.

23. The method of claim 19 wherein the filtering at least a portion of the optical spectrum with the imprinted dispersion of the optical link comprises demodulating the modulated optical signal with a delay interferometer.

24. The method of claim 23 further comprising selecting a delay of the delay interferometer that mitigates effects of dispersion in the modulated optical signal.

25. The method of claim 24 wherein the selected delay of the delay interferometer is in the range of 0.55-bit delay to 0.75-bit delay.

* * * * *